US011879907B2

(12) United States Patent
Yan et al.

(10) Patent No.: US 11,879,907 B2
(45) Date of Patent: Jan. 23, 2024

(54) ACCELERATION SENSOR

(71) Applicant: AAC Kaitai Technologies (Wuhan) CO., LTD, Hubei (CN)

(72) Inventors: Shitao Yan, Shenzhen (CN); Zhan Zhan, Shenzhen (CN); Shan Yang, Shenzhen (CN); Zhao Ma, Shenzhen (CN); Hongtao Peng, Shenzhen (CN); Xiao Kan, Shenzhen (CN); Yang Li, Shenzhen (CN); Kahkeen Lai, Singapore (SG); Yan Hong, Shenzhen (CN); Veronica Tan, Singapore (SG)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 0 days.

(21) Appl. No.: 17/879,814

(22) Filed: Aug. 3, 2022

(65) Prior Publication Data

US 2023/0228789 A1    Jul. 20, 2023

(30) Foreign Application Priority Data

Jan. 14, 2022  (CN) .......................... 202210040467.3

(51) Int. Cl.
| *G01P 15/125* | (2006.01) |
| *G01P 15/093* | (2006.01) |
| *G01P 15/18* | (2013.01) |
| *G01P 15/08* | (2006.01) |

(52) U.S. Cl.
CPC ........ *G01P 15/125* (2013.01); *G01P 15/0802* (2013.01); *G01P 15/093* (2013.01); *G01P 15/18* (2013.01)

(58) Field of Classification Search
CPC ..... G01P 15/125; G01P 15/18; G01P 15/0802
See application file for complete search history.

(56) References Cited

U.S. PATENT DOCUMENTS

| 8,205,498 B2* | 6/2012 | Hsu ...................... G01P 15/125 |
| | | 73/514.32 |
| 2013/0192362 A1* | 8/2013 | Rytkonen ................ G01P 15/08 |
| | | 73/504.08 |
| 2017/0108529 A1* | 4/2017 | Zhang ..................... G01P 15/18 |
| 2017/0363655 A1* | 12/2017 | Zhang ................... G01P 15/125 |
| 2018/0275161 A1* | 9/2018 | Tang ..................... G01P 15/125 |
| 2019/0049482 A1* | 2/2019 | Motiee .................. G01P 15/125 |

(Continued)

*Primary Examiner* — Helen C Kwok
(74) *Attorney, Agent, or Firm* — W&G Law Group

(57) ABSTRACT

The invention provides an acceleration sensor, including a sensing unit, a sensing unit includes a ring-shaped outer coupling unit; seesaw structures, including at least two and arranged on an inner side of the outer coupling unit; an inner coupling unit, including an inner coupling elastic beam connecting two adjacent seesaw structures; proof mass blocks fixed on the outer coupling unit or the inner coupling unit or the seesaw structures; an in-plane coupling elastic member elastically connecting the seesaw structures to the outer coupling unit; in-plane displacement detection devices arranged on the proof mass blocks and configured to detect movements of the proof mass blocks along the first direction and/or along the second direction; and out-of-plane displacement detection devices arranged on the outer coupling unit and/or the seesaw structures and/or the inner coupling unit configured to detect movements of the seesaw structures along the third direction.

15 Claims, 13 Drawing Sheets

(56) References Cited

U.S. PATENT DOCUMENTS

| | | | |
|---|---|---|---|
| 2019/0187169 A1* | 6/2019 | Tang | G01P 15/18 |
| 2020/0096538 A1* | 3/2020 | Zhang | G01P 15/0802 |
| 2020/0132716 A1* | 4/2020 | Zhang | G01P 15/125 |
| 2021/0215735 A1* | 7/2021 | Tseng | G01P 1/00 |
| 2021/0293847 A1* | 9/2021 | Liukku | G01P 15/18 |
| 2022/0390483 A1* | 12/2022 | Zhang | B81B 3/0021 |
| 2023/0003759 A1* | 1/2023 | Liukku | G01P 15/125 |

* cited by examiner

ACCELERATION SENSOR

TECHNICAL FIELD

The present invention relates to a sensor device, in particular to an acceleration sensor used in portable electronic products.

BACKGROUND

With a development of electronic technology, acceleration sensors are widely adopted in various portable electronic devices such as mobile phones and IPADs, to detect an acceleration of objects or devices in a moving or tilting state, to achieve 3D actions, and thus the acceleration sensors are favored by consumers.

An acceleration sensor in the related art includes a substrate, a sensing unit arranged on the substrate, and anchor blocks located at the same level as the sensing unit. The sensing unit includes a rectangular ring-shaped mass frame, proof mass blocks fixed on one side of the mass frame, and an inner coupling structure located on an inner side of the mass frame. The anchor blocks are configured to fix the proof mass blocks and the inner coupling structure to the substrate by means of insulation. The inner coupling structure is provided with an X/Y-direction first detection plate. The substrate is provided with an X/Y-direction second detection plate forming a capacitance structure with the X/Y-first detection plate, and a Z-direction second detection plate forming a capacitance structure with the Z-direction first detection plate. Since the proof mass blocks are arranged on one side of the mass frame, that is, a Z-direction acceleration (rotate around the X-axis) detection adopts asymmetric proof mass blocks in a seesaw structure. In an X-direction out-of-plane acceleration detection (translate along the X-axis) and a Y-direction out-of-plane acceleration detection (rotate around the Y-axis), the entire seesaw structure is used as a linear proof mass, and a multi-axis detection is realized through the corresponding capacitance plates. However, the disadvantage of the structure is that the proof mass blocks cannot be made larger, because the Z-direction acceleration detection adopts the asymmetric rotating proof mass block, and the quality reduction caused by other structures on the proof mass block is also limited, reducing the detection accuracy. Secondly, the asymmetric rotating proof mass of this structure will aggravate the rotation of the Z-direction out-of-plane second detection plate, reducing the detection linearity.

SUMMARY

The technical problem to be solved by the present invention is to provide an acceleration sensor with a compact structure, a small size, a high detection linearity, a high cross suppression ratio and a high precision.

In order to solve the above-mentioned technical problem, the present invention provides an acceleration sensor, comprising:
  a substrate;
  a sensing unit arranged on the substrate; and
  a plurality of anchor blocks fixed on the substrate and located at the same level as the sensing unit, and the anchor blocks are configured to fixed the sensing unit on the substrate;
  wherein the sensing unit comprises:
    an outer coupling unit, wherein the outer coupling unit has a ring structure, and comprises two first side beams spaced apart and opposite to each other along a first direction and two second side beams spaced apart and opposite to each other along a second direction; the outer coupling unit is stacked on the substrate, and a plane where the first direction and the second direction are located is parallel to the substrate;
    at least two seesaw structures, wherein every two seesaw structures are arranged at intervals on an inner side of the outer coupling unit, and each of the seesaw structures comprises two spaced torsion springs arranged parallel to the substrate and a connecting beam parallel to the substrate and fixed on the torsion spring; the connecting beam is perpendicular to the torsion springs, ends of the two torsion springs that are close to each other are connected to the connecting beam, and ends of the torsion springs away from each other are fixed on two anchor blocks and further fixed on the substrate through the anchor blocks;
    an inner coupling unit, comprising an inner coupling elastic beam, wherein the inner coupling elastic beam is located between two adjacent seesaw structures, and elastically connects the two adjacent seesaw structures; the inner coupling elastic beam is configured to generate a co-coupling to weaken a rotation in a surface of the seesaw structures when the seesaw structures moves along the third direction; wherealong the first direction, the second direction and the third direction are perpendicular to each other;
    proof mass blocks fixed on the outer coupling unit or the inner coupling unit or the seesaw structure;
    an in-plane coupling elastic member, wherein the in-plane coupling elastic member is located at one end of the seesaw structure away from the inner coupling elastic beam and is elastically connected to the seesaw structure to the outer coupling unit, and are configured to provide a flexible support for linear movements of the proof mass blocks along the first direction and/or the second direction and co-couple movements of the seesaw structures along the third direction;
    an in-plane displacement detection device arranged on the proof mass blocks, and configured to detect the linear movements of the proof mass blocks along the first direction and/or configured to detect the linear movements of the proof mass blocks along the second direction; and
    an out-of-plane displacement detection device arranged on the outer coupling unit and/or the seesaw structure and/or the inner coupling unit, and configured to detect movements of the proof mass blocks and/or the seesaw structure and/or the inner coupling unit along the third direction.

Preferably, the proof mass blocks are fixed on the outer coupling unit.

Preferably, the in-plane displacement detection device is a displacement-capacitance detection device or an optical displacement detection device, and the out-of-plane displacement detection device is a displacement-capacitance detection device or an optical displacement detection device.

Preferably, the in-plane displacement detection device is the displacement-capacitance detection device, comprising a plurality of X-axis in-plane displacement detection devices configured to detect the linear movements of the proof mass blocks along the first direction, and/or a plurality of Y-axis in-plane displacement detection devices configured to detect the linear movements of the proof mass blocks along the second direction;

each of the X-axis in-plane displacement detection devices comprises a first X-axis capacitance plate located on the proof mass blocks, and a second X-axis capacitance plate anchored on the substrate and forming a detection capacitance structure with the first X-axis capacitance plate; or each of the X-axis in-plane displacement detection devices comprises the first X-axis capacitance plate located on the proof mass blocks, the second X-axis capacitance plate anchored on the substrate and configured to form a detection capacitance structure with the first X-axis capacitance plate, and a third X-axis horizontal capacitance plate anchored on the substrate, forming a detection capacitance structure with the first X-axis capacitance plate and differentially arranged with the second X-axis capacitance plate;

the first X-axis capacitance plate extends along the second direction, and the second X-axis capacitance plate and the third X-axis capacitance plate are relatively spaced along the first direction;

each of the Y-axis in-plane displacement detection devices comprises a first Y-axis capacitance plate located on the proof mass blocks, and a second Y-axis capacitance plate anchored on the substrate and forming a detection capacitance structure with the first Y-axis capacitance plate; or each of the Y-axis in-plane displacement detection devices comprises the first Y-axis capacitance plate located on the proof mass blocks, the second Y-axis capacitance plate anchored on the substrate and configured to form a detection capacitance structure with the first Y-axis capacitance plate, and a third Y-axis horizontal capacitance plate anchored on the substrate, forming a detection capacitance structure with the first Y-axis capacitance plate and differentially arranged with the second Y-axis capacitance plate; and the first Y-axis capacitance plate extends along the first direction, and the second Y-axis capacitance plate and the third Y-axis capacitance plate are relatively spaced along the second direction.

Preferably, the out-of-plane displacement detection device is a displacement-capacitance detection device, and each of the out-of-plane displacement detection devices comprises a first Z-axis capacitance plate arranged on one side of the outer coupling unit and/or the seesaw structure and/or the inner coupling unit along the third direction, and a second Z-axis capacitance plate anchored on the substrate and forming a detection capacitance structure with the first Z-axis capacitance plate; or the out-of-plane displacement detection device is the displacement-capacitance detection device, and each of the out-of-plane displacement detection devices comprises the first Z-axis capacitance plate arranged on one side of the outer coupling unit and/or the seesaw structure and/or the inner coupling unit along the third direction, the second Z-axis capacitance plate anchored on the substrate and forming a detection capacitance structure with the first Z-axis capacitance plate, and a third Z-axis horizontal capacitance plate arranged on the other side of the outer coupling unit and/or the seesaw structures and/or the inner coupling unit along the third direction, forming a detection capacitance structure with the second Z-axis capacitance plate and differentially arranged with the first Z-axis capacitance plate.

Preferably, the first Z-axis capacitance plate is fixed on two ends of the connecting beam of the seesaw structures.

Preferably, the in-plane displacement detection device comprises the plurality of X-axis in-plane displacement detection devices; the proof mass blocks located on the two second side beams are provided with a plurality of spaced first through openings, and the first through openings extend through the proof mass blocks along the third direction; each of the first through openings is provided with one of the first X-axis capacitance plates fixed on the proof mass blocks; each of the second X-axis capacitance plates, or one of the second X-axis capacitance plates and one of the third X-axis capacitance plates that form a differential arrangement therewith extend from the substrate to the same first through opening.

Preferably, the in-plane coupling elastic member comprises a first elastic member, wherein the first elastic member is located between the seesaw structures and the first side beams and elastically connects the seesaw structure to the first side beams, which is configured to provide a flexible support for the linear movements of the proof mass blocks along the first direction and co-couple the movements of the seesaw structures along the third direction.

Preferably, the in-plane displacement detection device comprises the plurality of the Y-axis in-plane displacement detection devices; the proof mass blocks located on the two second side beams are provided with a plurality of spaced second through openings, and the second through openings extend through the proof mass blocks along the third direction; each of the second through openings is provided with one of the second Y-axis capacitance plates fixed on the proof mass blocks; each of the second Y-axis capacitance plates, or one of the second Y-axis capacitance plates and one of the third Y-axis capacitance plates that form a differential arrangement therewith extend from the substrate to the same second through opening.

Preferably, the in-plane coupling elastic member comprises a second elastic member, wherein the second elastic member is located between the seesaw structures and the second side beams and elastically connects the seesaw structures to the second side beams, which is configured to provide a flexible support for the linear movements of the proof mass blocks along the second direction and co-couple the movements of the seesaw structures along the third direction.

Preferably, there are two seesaw structure that form a nested structure with each other, which are respectively defined as a first seesaw structure and a second seesaw structure; the outer coupling unit further comprises a first outer coupling beam extending from the two second side beams to the first seesaw structure and a second outer coupling beam extending to the second seesaw structure; a torsion spring of the first seesaw structure and a torsion spring of the second seesaw structure are both arranged parallel to the second direction and staggered along the second direction; two ends of a connecting beam of the first seesaw structure and two ends of a connecting beam of the second seesaw structure are all provided with the first Z-axis capacitance plate;

the first outer coupling beam extends to a side of the torsion spring of the first seesaw structure away from the second seesaw structure and is spaced apart from the torsion spring of the first seesaw structure, and the second outer coupling beam extends to a side of the torsion spring of the second seesaw structure away from the second seesaw structure and is spaced apart from the torsion spring of the second seesaw structure;

the first Z-axis capacitance plate arranged on the first seesaw structure and close to the second seesaw structure is located on a side of the torsion spring of the second seesaw structure close to the first seesaw structure and is spaced apart from the torsion spring of the second seesaw structure, and the first Z-axis capacitance plate arranged on the second seesaw structure and close to the first seesaw structure is located on a side of the torsion spring of the first seesaw structure and is spaced apart from the torsion spring of the first seesaw structure, so as to form the nested structure of the two first Z-axis capacitance plates; and the inner coupling elastic beam is located between the two first Z-axis capacitance plates formed in the nested structure, and elastically connects the connecting beam of the first seesaw structure to the connecting beam of the second seesaw structure. Preferably, when the in-plane displacement detection device comprises the X-axis in-plane displacement detection devices configured to detect the linear movements of the proof mass blocks along the first direction, the X-axis in-plane displacement detection devices are further arranged on the first outer coupling beam and the second outer coupling beam; the first outer coupling beam and the second outer coupling beam are both provided with the proof mass blocks; the proof mass blocks arranged on the first outer coupling beam are provided with the first through openings extending the proof mass blocks arranged on the first outer coupling beam along the third direction, and the proof mass blocks arranged on the second outer coupling beam are provided with the first through openings extending the proof mass blocks arranged on the second outer coupling beam along the third direction; an inner side of the first through openings is provided with the first X-axis capacitance plate; each of the second X-axis capacitance plates, or one of the second X-axis capacitance plates and one of the third X-axis capacitance plates that form a differential arrangement therewith extend from the substrate into the same first through hole.

Preferably, there are two seesaw structure arranged side by side along the first direction;

the outer coupling unit further comprises outer coupling walls, and each of the second side beams respectively extends to the two seesaw structures to form two outer coupling walls;

the inner coupling unit further comprises two inner coupling walls respectively fixed on two ends of the inner coupling elastic beam along the second direction, and the inner coupling walls are spaced apart from the seesaw structures and the outer coupling unit; and the first Z-axis capacitance plates are respectively arranged on the outer coupling wall and the inner coupling wall.

Preferably, each of the inner coupling walls is provided with two first Z-axis capacitance plates spaced apart at two ends of the corresponding inner coupling wall along the first direction; the two first Z-axis capacitance plates arranged at two ends of the same inner coupling wall are located between the two outer coupling walls formed by an extension of the same second side beam.

Preferably, the outer coupling unit is square, and there are four seesaw structures arranged in the outer coupling unit in a matrix; the inner coupling elastic beam is located in a middle of the four seesaw structures and elastically connects the four seesaw structures; every two seesaw structures form a group and are located on one of diagonal lines of the outer coupling units, and connecting beams of the group of the seesaw structures are parallel to the diagonal line.

Preferably, there are four seesaw structure formed a nested structure with each other, and the four seesaw structures are sequentially defined as a first seesaw structure, a second seesaw structure, a third seesaw structure and a fourth seesaw structure along a clockwise direction; the outer coupling unit further comprises four accommodating grooves recessed outward from inner sides of the two first side beams and inner sides of the two second side beams;

a torsion spring of the first seesaw structure and a torsion spring of the third seesaw structure are both arranged parallel to the first direction and staggered along the second direction;

two ends of the connecting beam of the first seesaw structure are provided with the first Z-axis capacitance plate, wherein the first Z-axis capacitance plate at one end is located in the accommodating groove formed by a recession of one of the second side beam, and the first Z-axis capacitance plate at the other end is located in the inner side of the outer coupling unit;

two ends of the connecting beam of the third seesaw structure are provided with the first Z-axis capacitance plate, wherein the first Z-axis capacitance plate at one end is located in the accommodating groove formed by a recession of the other one of the second side beam, and the first Z-axis capacitance plate at the other end is located in the inner side of the outer coupling unit;

a combined structure comprising the first seesaw structure and the first Z-axis capacitance plates arranged at two ends of the first seesaw structure and a combined structure comprising the third seesaw structure and the first Z-axis capacitance plates arranged at two ends of the third seesaw structure are central-symmetric with a geometric center of the outer coupling unit;

a torsion spring of the second seesaw structure and a torsion spring of the fourth seesaw structure are both arranged parallel to the second direction and staggered along the first direction;

two ends of the connecting beam of the second seesaw structure are provided with the first Z-axis capacitance plate, wherein the first Z-axis capacitance plate at one end is located in the accommodating groove formed by a recession of one of the first side beam, and the first Z-axis capacitance plate at the other end is located in the inner side of the outer coupling unit;

two ends of the connecting beam of the fourth seesaw structure are provided with the first Z-axis capacitance plate, wherein the first Z-axis capacitance plate at one end is located in the accommodating groove formed by a recession of the other one of the first side beam, and the first Z-axis capacitance plate at the other end is located at the inner side of the outer coupling unit;

a combined structure comprising the second seesaw structure and the first Z-axis capacitance plates arranged at two ends of the second seesaw structure and a combined structure comprising the fourth seesaw structure and the first Z-axis capacitance plates arranged at two ends of the fourth seesaw structure are central-symmetric with the geometric center of the outer coupling unit; and the four first Z-axis capacitance plates located in the inner side of the outer coupling unit are sequentially arranged in a matrix.

Preferably, there are four seesaw structures, which are sequentially defined as a first seesaw structure, a second seesaw structure, a third seesaw structure and a fourth seesaw structure along a clockwise direction; the outer coupling unit further comprises four accommodating grooves recessed outward from inner sides of the two first side beams and inner sides of the two second side beams;

a torsion spring of the first seesaw structure and a torsion spring of the third seesaw structure are both arranged parallel to the first direction and staggered along the second direction;

one end of a connecting beam of the first seesaw structure extends into the accommodating groove formed by a recession of one of the second side beams, and the other end extends to the inner side of the outer coupling unit;

one end of a connecting beam of the third seesaw structure extends into the accommodating groove formed by a recession of the other one of the second side beam, and the other end of the connecting beam of the third seesaw structure extends into the inner side of the outer coupling unit;

the first seesaw structure and the third seesaw structure are center-symmetrical with a geometric center of the outer coupling unit;

a torsion spring of the second seesaw structure and a torsion spring of the fourth seesaw structure are both arranged parallel to the second direction and staggered along the first direction;

one end of a connecting beam of the second seesaw structure extends into the accommodating groove formed by a recession of one of the first side beams, and the other end of the connecting beam of the second seesaw structure extends into the inner side of the outer coupling unit;

one end of a connecting beam of the fourth seesaw structure extends into the accommodating groove formed by a recession of the other one of the first side beams, and the other end of the connecting beam of the fourth seesaw structure extends into the inner side of the outer coupling unit;

the second seesaw structure and the fourth seesaw structure are center-symmetrical with the geometric center of the outer coupling unit; and the first Z-axis capacitance plates are respectively arranged on the outer coupling unit and the inner side of the outer coupling unit; the first Z-axis capacitance plates located at the inner side of the outer coupling unit are located at ends of the four seesaw structures that are close to each other, and are respectively connected to the four seesaw structures through the inner coupling elastic beams.

Compared with the related art, in the acceleration sensor of the present invention, the sensing unit includes at least two seesaw structures fixed on the substrate through anchor blocks, and the seesaw structures are located at the inner side of the outer coupling unit. The adjacent seesaw structures are connected through the inner coupling unit, so as to generate the co-coupling when the seesaw structures move along a third direction (the Z-axis direction) and weaken a rotation in a surface of the seesaw structures. Through the design of the inner coupling unit, the seesaw structures can move along the third direction. Each seesaw structure is connected to the outer coupling unit through an in-plane coupling elastic member, and is configured to provide the flexible support for the linear movements of the proof mass blocks along the first direction (X-axis direction) and co-couple the movements of the seesaw structures along the second direction (Y-axis direction). Through the design of the in-plane coupling elastic member, the outer coupling unit can generate the linear movement along the first direction and/or the third direction. The in-plane displacement detection device is arranged on the proof mass blocks, and is configured to detect the linear movements of the proof mass blocks along the first direction, and/or configured to detect the linear movements of the proof mass blocks along the second direction. The out-of-plane displacement detection devices are arranged on the outer coupling unit and/or the seesaw structure and/or the inner coupling unit, and are configured to detect the linear movements of the seesaw structures along the third direction, thereby realizing a multi-axis detection function. Since the proof mass blocks are attached and fixed on the outer coupling unit or the inner coupling unit or the seesaw structures, after the above structure is set, the seesaw structures are configured as a supporting structure of the proof mass blocks, so that the proof mass blocks move along the Z-axis under an action of an in-plane direction (Z direction) acceleration, and the movement displacement greatly improves a linearity of the displacement detection. The above structure makes the multi-axis detection of the X/Y-axis and the Z-axis share one proof mass blocks, so that the proof mass blocks can be made larger to improve the detection accuracy. A mass center of the seesaw structures is close to or at a rotation axis. This distribution method of the proof mass blocks makes the mass more concentrated, the structure is more reasonable, and the parasitic modes are less, so that the acceleration sensor provided by the embodiment of the present invention has a compact structure and a small size.

BRIEF DESCRIPTION OF THE DRAWINGS

In order to describe the technical solutions in the embodiments of the present invention more clearly, accompanying drawings required to be used in the descriptions of the embodiments will be briefly introduced below. Obviously, the drawings in the illustration below are merely some embodiments of the present invention. Those ordinarily skilled in the art also can acquire other drawings according to the provided drawings without doing creative work.

FIG. 3A-3C illustrate simulation diagrams of detection modes of the acceleration sensor according to Embodiment 1 of the present invention, in which FIG. 3A illustrates an X-axis detection mode, FIG. 3B illustrates a Y-axis detection mode, and FIG. 3C illustrates a Z-axis detection mode.

FIG. 7A-7C illustrate simulation diagrams of detection modes of the acceleration sensor according to Embodiment 4 of the present invention, in which FIG. 7A illustrates the X-axis detection mode, FIG. 7B illustrates the Y-axis detection mode, and FIG. 7C illustrates the Z-axis detection mode.

FIG. 11A-11C illustrate simulation diagrams of the detection modes of the acceleration sensor according to Embodiment 7 of the present invention, in which FIG. 11A illustrates the X-axis detection mode, FIG. 11B illustrates the Y-axis detection mode, and FIG. 11C illustrates the Z-axis detection mode.

DETAILED DESCRIPTION OF THE EMBODIMENTS

The technical solutions in the embodiments of the present invention will be described clearly and completely below with reference to the drawings in the embodiments of the present invention. Obviously, the embodiments described herein are only part of the embodiments of the present invention, not all the embodiments. Based on the embodiments in the present disclosure, all other embodiments obtained by those of ordinary skill in the art without creative work shall fall within the protection scope of the present disclosure.

Figure 1:
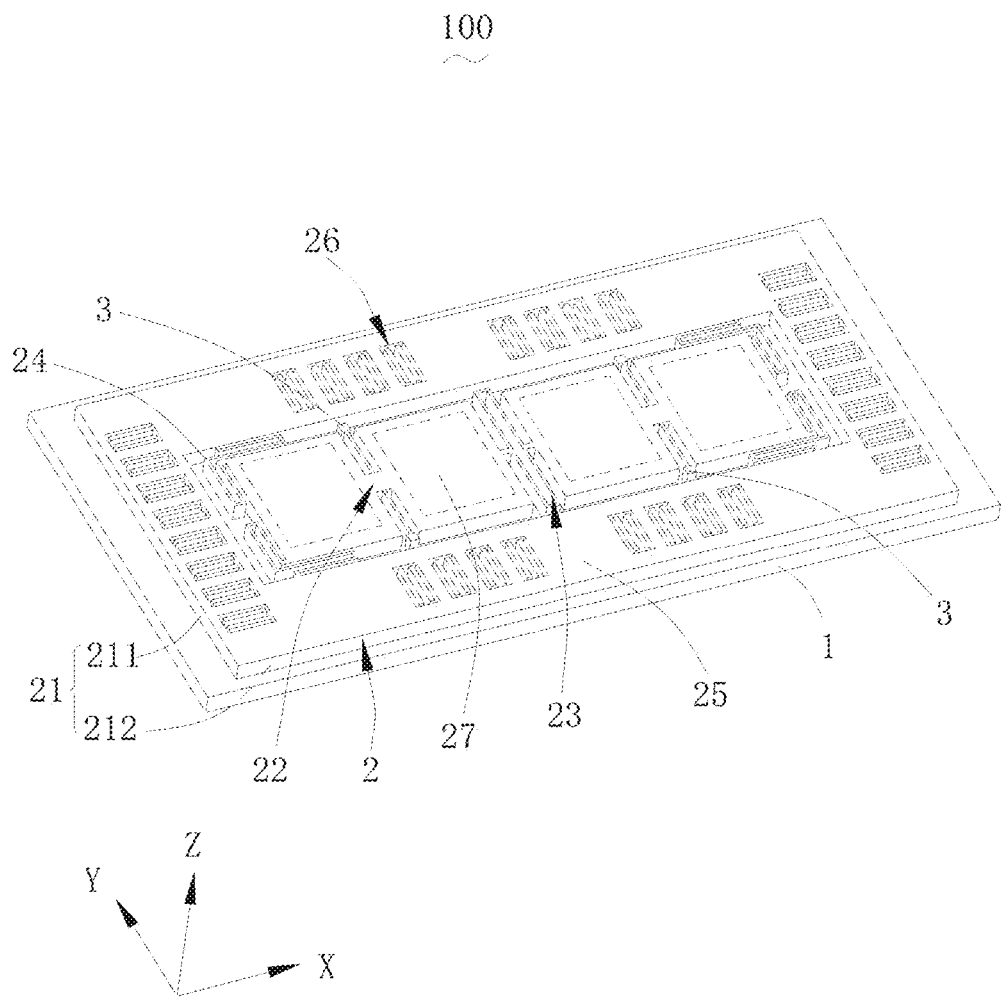
FIG. 1 is a schematic three-dimensional structure view of an acceleration sensor according to an embodiment of the present invention.

Referring to FIG. 1, the present invention provides an acceleration sensor 100, including a substrate 1, a sensing unit 2 and anchor blocks 3.

A shape of the substrate 1 is not limited herein, and the substrate 1 is described as being rectangular in the following embodiments of the present invention.

The sensing unit 2 is arranged on the substrate 1. There are a plurality of anchor blocks 3 located at the same level as the sensing unit 2, and the plurality of anchor blocks 3 fix the sensing unit 2 on the substrate 1.

In order to facilitate the description of the acceleration sensor 100 of the present invention, an X-Y-Z-axis three-dimensional coordinate system is established, in which a first direction is an X-axis direction, a second direction is a Y-axis direction, and a third direction is a Z-axis direction. The first direction, the second direction and the third direction are perpendicular to each other.

Figure 2:
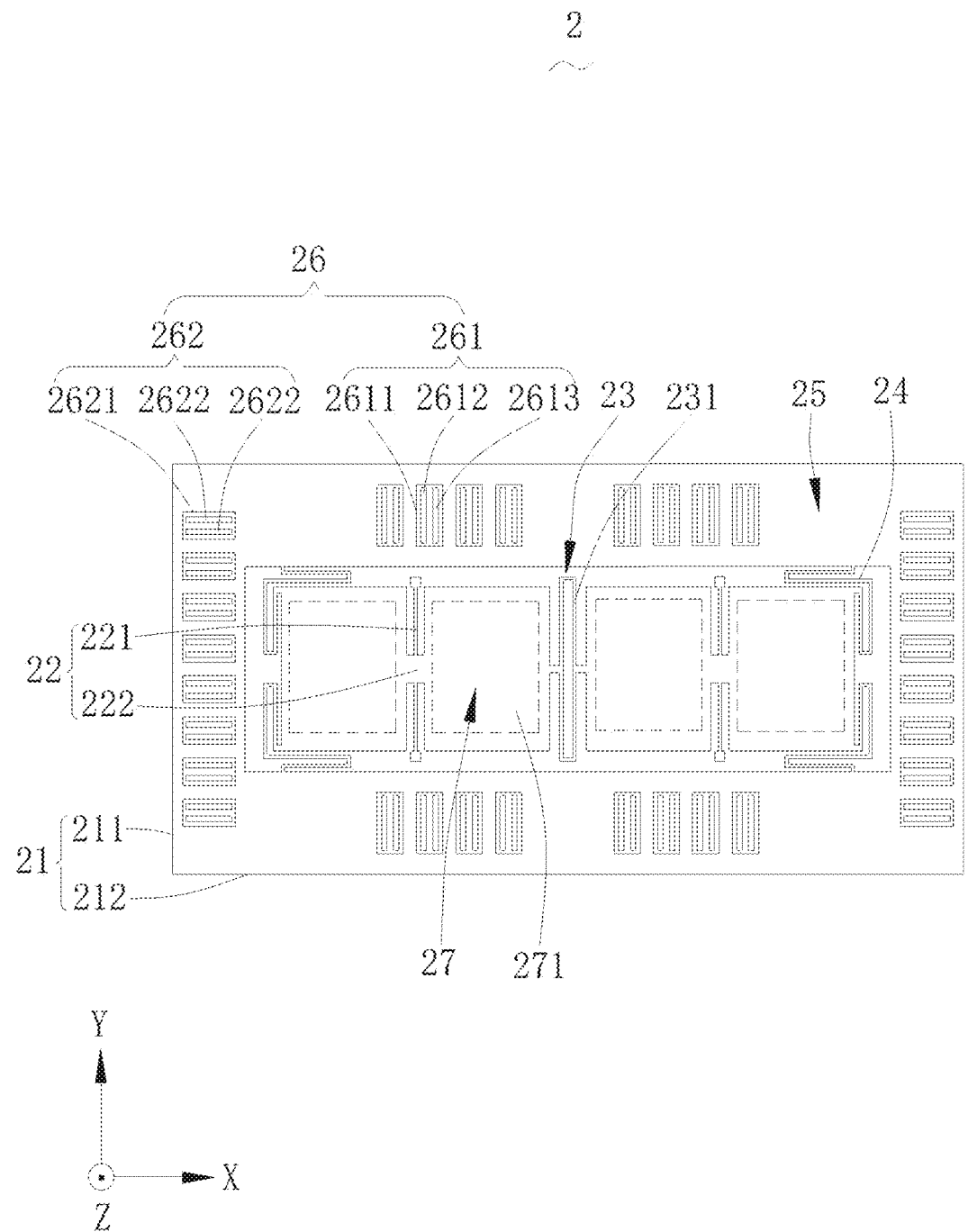
FIG. 2 is a schematic structural view of a sensing unit of the acceleration sensor according to Embodiment 1 of the present invention.

Referring to FIGS. 1-2, the sensing unit 2 includes an outer coupling unit 21, seesaw structures 22, an inner coupling unit 23, in-plane coupling elastic members 24, proof mass blocks 25, an in-plane displacement detection device 26 and an out-of-plane displacement detection device 27.

The outer coupling unit 21 has a ring-shaped structure, and includes two first side beams 211 spaced apart and opposite to each other along the first direction (X-axis direction) and two second side beams 212 spaced apart and opposite to each other along the second direction (Y-axis direction). The outer coupling unit 21 is stacked on the substrate 1, and the plane where the first direction and the second direction are located is parallel to the substrate 1.

There are at least two seesaw structures 22 and every two seesaw structures are arranged at intervals on an inner side of the outer coupling unit, that is, located in an area enclosed by the outer coupling unit 21 and spaced from the outer coupling unit 21. Through this arrangement, parasitic modes are eliminated and movements of the seesaw structures 22 are co-coupled. The seesaw structures 22 may be two or more, and the seesaw structures 22 may be symmetrical or asymmetrical.

Specifically, each of the seesaw structures 22 includes two spaced torsion springs 221 arranged parallel to the substrate 1 and a connecting beam 222 parallel to the substrate 1 and fixed on the torsion springs 221. The connecting beam 222 is perpendicular to the torsion spring 221, ends of the two torsion springs 221 that are close to each other are connected to the connecting beam 222, and the ends of the two torsion springs 221 away from each other are fixed on the anchor blocks 3 and further fixed on the substrate 1 through the anchor blocks 3.

It should be noted that, the two torsion springs 221 in each of the seesaw structures 22 may be arranged on the same straight line or arranged in a staggered manner without being on the same straight line. The above-mentioned connecting beam 222 is perpendicular to the torsion spring 221. It may be easily understood that it is not limited to being absolutely perpendicular to each other at 90°, and further include the small-angle offset setting of the torsion spring 221 within the allowable range, but their functions and work principles are the same. Preferably, the connecting beam 222 and the torsion spring 221 are arranged in an absolutely perpendicular state to each other.

The inner coupling unit 23 includes an inner coupling elastic beam 231. The inner coupling elastic beam 231 is located between two adjacent seesaw structures 22 and elastically connects the two adjacent seesaw structures 22, which is configured to generate a co-coupling to weaken a rotation in a surface of the seesaw structures when the seesaw structures move along the third direction (Z-axis direction). Since the out-of-plane rotation is required, and the in-plane rotation is not required (i.e., rotate around the Z-axis along the third direction), the in-plane rotation of the seesaw structures 22 is required to be weakened. The torsion spring 221 is the shaft rotating along the third direction. The first direction (X-axis direction), the second direction (Y-axis direction), and the third direction (Z-axis direction) are perpendicular to each other.

The proof mass blocks 25 are fixed on the outer coupling unit 21 or the inner coupling unit 23 or the seesaw structures 22. The proof mass blocks 25 are configured to increase the Coriolis force, thereby enhancing the overall sensing performance of the acceleration sensor 100.

The in-plane coupling elastic members 24 are located at the ends of the seesaw structures 22 away from the inner coupling elastic beam 231, and elastically connects the seesaw structures 22 to the outer coupling unit 21 through the in-plane coupling elastic member 24, so as to provide a flexible support for linear movements of the proof mass blocks 25 along the first direction and/or the second direction and co-couple movements of the seesaw structures 22 along the third direction. In order to achieve the above-mentioned purpose, the structural design of the in-plane coupling elastic member 24 itself is a conventional means that is easy to implement, and therefore will not be described in detail.

The in-plane displacement detection devices 26 are arranged on the proof mass blocks 25 and are configured to detect the linear movements of the proof mass blocks 25 along the first direction, and/or configured to detect the linear movements of the proof mass blocks 25 along the second direction, so as to realize two single-axis detections in the X-axis or Y-axis direction, or realize a dual-axis detection in the X-axis and Y-axis directions.

The in-plane displacement detection device 26 may be a capacitance displacement detection structure, such as a displacement-capacitance detection device, or an optical displacement detection device, such as an optical interference type displacement detection device, or a light intensity type displacement detection device. The above devices are all feasible.

The out-of-plane displacement detection devices 27 are arranged on the outer coupling unit 21 and/or the seesaw structures 22 and/or the inner coupling unit 23, and are configured to detect the movements of the proof mass blocks 25 and/or the seesaw structures 22 and/or the inner coupling unit 23 along the third direction. The structure is provided with the out-of-plane displacement detection device 27 to detect its out-of-plane movement, that is, the movement along the third direction. that is, the movement along the third direction. Therefore, the out-of-plane displacement detection device 27 and the in-plane displacement detection device 26 jointly realize a dual-axis detection of the X-axis and the Z-axis, or jointly realize a dual-axis detection of the Y-axis and the Z-axis, or jointly realize a three-axis detection of the X-axis, the Y-axis and the Z-axis.

The out-of-plane displacement detection devices 27 may be a capacitance displacement detection device, such as a displacement-capacitance detection device, or an optical displacement detection device, such as an optical interference type displacement detection device or a light intensity type displacement detection device. The above devices are all feasible.

A main function of the inner coupling unit 23 may be to make the rotations of the seesaw structures 22 co-coupling, to suppress other translational and rotational modes of the seesaw structures 22, and provide the proof mass required for inertial detection, making the proof mass have out-of-plane translation mode, and provide an end to be detected or a detection end for arranging the in-plane displacement detection device 26 and the out-of-plane displacement detection device 27.

A main function of the in-plane coupling elastic member 24 is to provide a flexible support for the linear movements of the proof mass blocks 25 and make the seesaw structures 22 rotationally coupled along the third direction, to suppress other translational and rotational modes of the seesaw structures, and to provide the proof mass required for inertial detection, making the proof mass have an out-of-plane translation mode, and provide a detection end or an end to be detected for arranging the in-plane displacement detection device 26 and the out-of-plane displacement detection device 27.

The acceleration sensor 100 of the above-mentioned structure of the present invention adopts two or more seesaw structures 22 as a supporting structure of the proof mass blocks 25, making the proof mass blocks 25 generate linear movements along the Z-axis under an acceleration action in an in-plane direction (i.e., the Z-axis direction). The linear displacement is not only conducive to improving a linearity of capacitance displacement detection, but also to improving a linearity of other non-capacitive detection methods, such as an optical displacement detection.

A double-coupling structure is adopted to make the rotation of the seesaw structures 22 co-coupling, so as to suppresses the remaining translational and rotational modes of the seesaw structures 22 and improves a detection cross suppression ratio. The cross suppression ratio is a suppression ratio of a cross axis, which represents an anti-interference ability of a measurement axis to an acceleration of the remaining non-side beam axis caused by the parasitic mode. Therefore, suppressing the remaining modes of the seesaw structures 22 can improve the cross suppression ratio.

By designing the inner coupling elastic beam 231 and/or the in-plane coupling elastic member 24, the proof mass blocks 25 can have linear movement mode in the X-axis direction, or the Y-axis direction, or the X-axis direction and the Y-axis direction. This linear displacement is not only conducive to improving a linearity of the capacitance displacement detection structure, but also to improving the linearity of other non-capacitive detection methods, such as optical displacement detection.

The acceleration sensor 100 of the present invention realizes that the multi-axis detection of the X-axis and/or the Y-axis and the Z-axis shares one proof mass blocks 25, so that the proof mass blocks 25 can be made larger and the detection accuracy is improved. A mass center of each seesaw structures 22 is close to or at a rotation axis. This distribution of the proof mass blocks 25 makes their mass more concentrated, the structure more reasonable, and the parasitic modes less. Besides, the acceleration sensor 100 provided by the embodiment of the present invention has a compact structure and a small size.

It should be noted that the proof mass blocks 25 are mainly distributed on the outer coupling unit 21, and may also be distributed on the inner coupling unit 23 or the seesaw structures 22. The proof mass blocks 25 are located on the inner coupling unit 23 or the outer coupling unit 21 or the seesaw structures 22. Through the structural design of the inner coupling elastic beam 231 and the in-plane coupling elastic member 24, the proof mass blocks 25 have a linear movement mode in the in-plane direction (X-axis direction/Y-axis direction) perpendicular to the plane of the substrate 1 and a linear movement mode with one or two degrees of freedom parallel to the plane of the substrate 1. In these modes, the moving directions of the proof mass blocks 25 are perpendicular to each other, so that the proof mass blocks 25 move linearly along the in-plane direction (X-axis direction/Y-axis direction) perpendicular to the plane of the substrate 1 under an in-plane acceleration action, and move linearly along the out-of-plane direction (Z-axis direction) parallel to the plane of the base 1 under an out-of-plane acceleration action. One or more in-plane displacement detection devices 26 are configured to detect the rotations of the seesaw structures 22 or the in-plane linear movements of the proof mass blocks 25 caused by in-plane (X-axis/Y-axis) acceleration. One or more out-of-plane displacement detection devices 27 are configured to detect the out-of-plane linear movements of the proof mass blocks 25 with one degree of freedom or two degrees of freedom caused by the out-of-plane (Z-axis direction) acceleration.

In the embodiment of the present invention, the proof mass blocks 25 are fixed on the outer coupling unit 21 as an example for description. The in-plane displacement detection device 26 and the out-of-plane displacement detection device 27 are both displacement-capacitance detection devices as an example for description.

Embodiment 1

Referring to FIGS. 1-2, the in-plane displacement detection device 26 is a displacement-capacitance detection device, including a plurality of X-axis in-plane displacement detection devices configured to detect the linear movements of the proof mass blocks 25 along the first direction and a plurality of Y-axis in-plane displacement detection devices 262 configured to detect the linear movements of the proof mass blocks 25 along the second direction.

Each of the X-axis in-plane displacement detection devices 261 includes a first X-axis capacitance plate 2611 fixed on the proof mass blocks 25 and a second X-axis capacitance plate 2612 anchored on the substrate 1 and forming a detection capacitance structure with the first X-axis capacitance plate 2611.

Alternatively, each of the X-axis in-plane displacement detection devices 261 includes the first X-axis capacitance plate 2611 located on the proof mass blocks 25, the second X-axis capacitance plate 2612 anchored on the substrate 1 and forming the detection capacitance structure with the first X-axis capacitance plate 2611, and a third X-axis horizontal capacitance platev2613 anchored on the substrate 1, forming a detection capacitance structure with the first X-axis capacitance plate 2611 and differentially arranged with the second X-axis capacitance plate 2612. The arrangement of the third X-axis horizontal capacitance plate 2613 can effectively increase the sensitivity of detecting the capacitance structure.

The first X-axis capacitance plate 2611 is arranged on the proof mass blocks 25 and extends along the second direction. The second X-axis capacitance plate 2612 and the third X-axis capacitance plate 2613 also extend along the second direction, and are relatively spaced along the first direction. Of course, the second X-axis capacitance plate 2612 and the third X-axis capacitance plate 2613 may also be arranged on a cavity cover CAP, as long as they form a capacitance structure with the first X-axis capacitance plate 2611 with the same principle.

Each of the Y-axis in-plane displacement detection devices 262 includes a first Y-axis capacitance plate 2621 located on the proof mass blocks 25 and a second Y-axis capacitance plate 2622 anchored on the substrate 1 and forming a detection capacitance structure with the first Y-axis capacitance plate 2611.

Alternatively, each of the Y-axis in-plane displacement detection devices 262 includes the first Y-axis capacitance plate 2621 located on the proof mass blocks 25, the second Y-axis capacitance plate 2622 anchored on the substrate 1 and forming the detection capacitance structure with the first Y-axis capacitance plate 2611 and a third Y-axis horizontal capacitance plate 2623 anchored on the substrate 1, forming a detection capacitance structure with the first Y-axis capacitance plate 2621 and differentially arranged with the second Y-axis capacitance plate 2622. The arrangement of the third Y-axis horizontal capacitance plate 2623 can effectively increase the sensitivity of the detection capacitance structure.

The first Y-axis capacitance plate 2621 is arranged on the proof mass blocks 25 and extends along the first direction. The second Y-axis capacitance plate 2622 and the third Y-axis capacitance plate 2623 also extend along the first direction, and extending along the first direction, the second Y-axis capacitance plate 2622 and are relatively spaced along the second direction.

Of course, the second Y-axis capacitance plate 2622 and the third Y-axis capacitance plate 2623 may also be arranged on the cavity cover CAP, as long as they form a capacitor structure with the first Y-axis capacitance plate 2621 with the same principle.

The out-of-plane displacement detection devices 27 are displacement-capacitance detection devices, and each of the out-of-plane displacement detection devices 27 includes a first Z-axis capacitance plate 271 arranged on one side of the outer coupling unit 21 and/or the seesaw structures 22 and/or the inner coupling unit 23 along the third direction, and a second Z-axis capacitance plate (not shown in the figures) anchored on the substrate 1 and forming a detection capacitance structure with the first Z-axis capacitance plate 271. The second Z-axis capacitor electrode plate is fixed on the base 1 and is spaced relative to the first Z-axis capacitance plate 271 along the third direction.

Alternatively, each of the out-of-plane displacement detection devices 27 includes a first Z-axis capacitance plate 271 arranged on one side of the outer coupling unit 21 and/or the seesaw structures 22 and/or the inner coupling unit 23 along the third direction, a second Z-axis capacitance plate (not shown in the figures) anchored on the substrate 1 and forming a detection capacitance structure with the first Z-axis capacitance plate 271, and a third Z-axis horizontal capacitance plate (not shown in the figures) arranged on the other side of the outer coupling unit 21 and/or the seesaw structures 22 and/or the inner coupling unit 23 along the third direction, forming a detection capacitance structure with the second Z-axis capacitance plate and differentially arranged with the first Z-axis capacitance plate 271. The arrangement of the third Z-axis horizontal capacitance plate can effectively increase the sensitivity of the detection capacitive structure.

In this embodiment, the first Z-axis capacitance plate 271 is fixed on two ends of the connecting beam 222. The second Z-axis horizontal capacitance plate and the third Z-axis horizontal capacitance plate may also be arranged on the cavity cover CAP, as long as they form a capacitor structure with the first Z-axis horizontal capacitance plate 271 with the same principle.

Figure 3A:
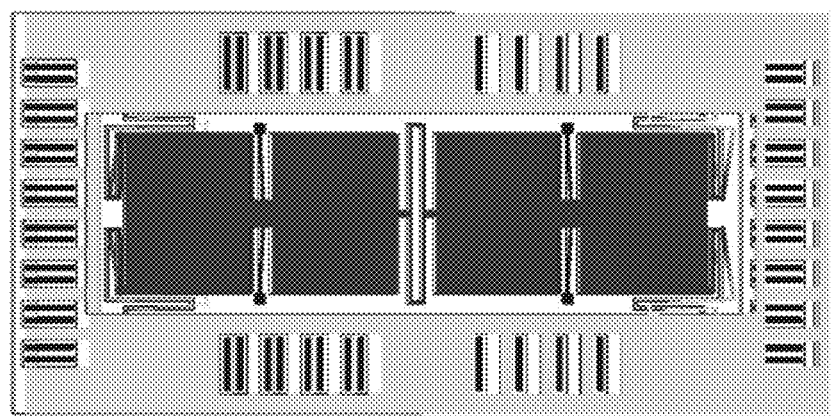
Figure 3B:
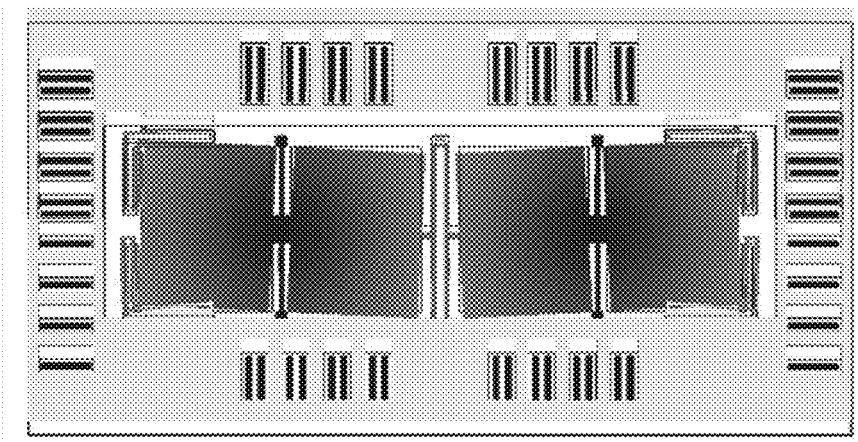
Figure 3C:
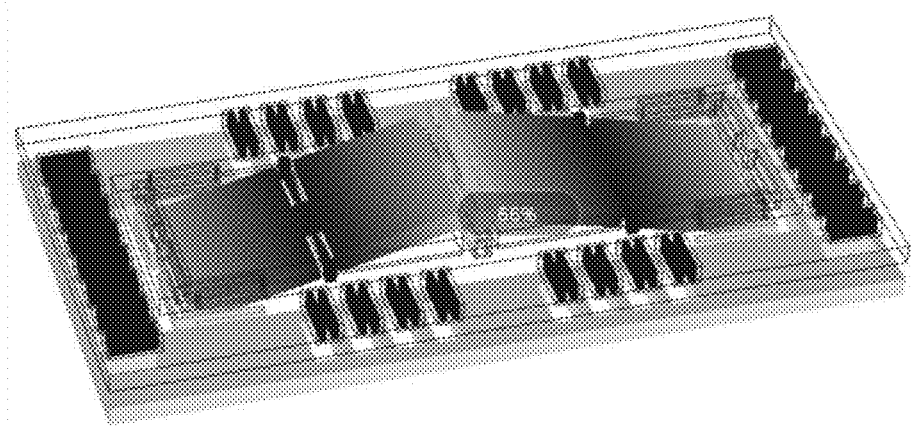

This embodiment provides a three-axis capacitance type acceleration sensor. By designing a spring structure of the in-plane coupling elastic member 24, the proof mass blocks 25 have linear movement modes both in the X-axis direction and Y-axis direction. The first X-axis capacitance plate 2611 and the second X-axis capacitance plate detect the linear displacement of the proof mass blocks 25 along the X-axis direction caused by acceleration in the X-axis direction. The first Y-axis capacitance plate 2621 and the second Y-axis capacitance plate detect linear displacement of the proof mass blocks 25 along the Y-axis direction caused by acceleration along the Y-axis direction. The first Z-axis capacitance plate 271 detects the rotation of the seesaw structures 22 caused by the movement of the proof mass blocks 25 along the Z-axis direction caused by the in-plane acceleration. Since the out-of-plane displacement detection devices 27 used for Z-axis detection in this embodiment are arranged in areas close to both sides of the rotating shaft, the gain of the rotation to capacitance change in this embodiment will not be too high. The specific detection modes of the X-axis, Y-axis and Z-axis are illustrated in FIG. 3, in which FIG. 3A illustrates an X-axis detection mode, FIG. 3B illustrates a Y-axis detection mode, and FIG. 3C illustrates a Z-axis detection mode.

Embodiment 2

Figure 4:
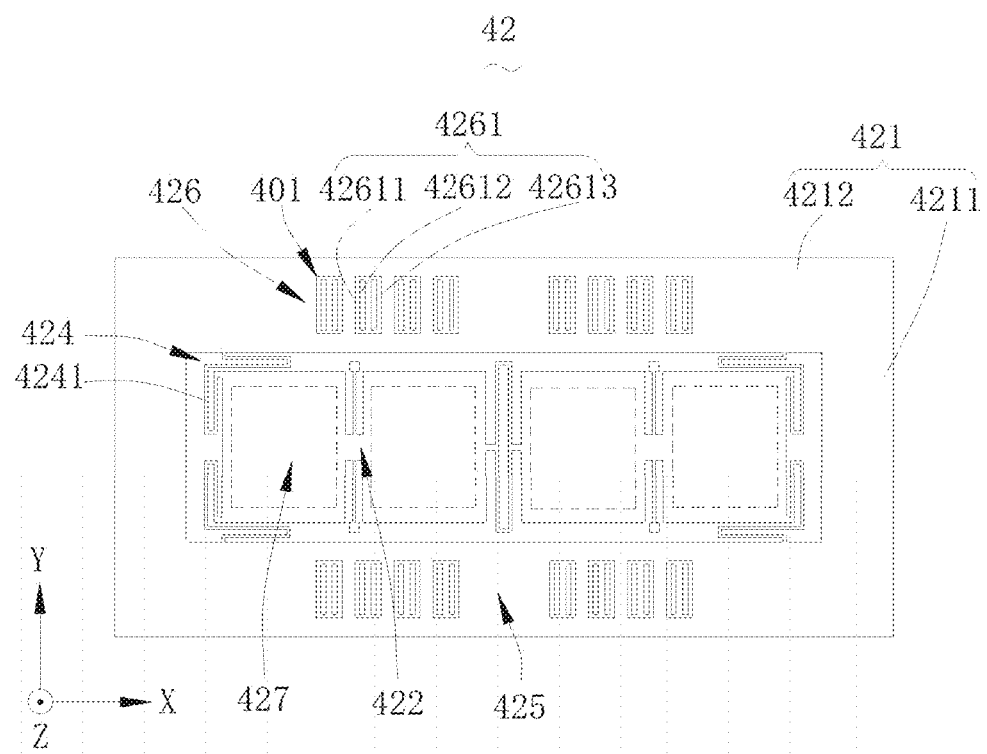
FIG. 4 is a schematic structural view of the sensing unit of the acceleration sensor according to Embodiment 2 of the present invention.

Referring to FIG. 4, this embodiment is basically the same as the above-mentioned Embodiment 1, except that in the sensing unit 42 in this embodiment, the out-of-plane displacement detection device 427 and the in-plane displacement detection device 426 jointly realize a dual-axis detection of X-axis and Z-axis. That is, The in-plane displacement detection device 426 is only provided with the X-axis in-plane displacement detection devices 4261 without providing with the Y-axis in-plane displacement detection device. The proof mass blocks 425 have both the X-axis and Z-axis linear movement modes. The X-axis in-plane displacement detection devices 4261 detect the linear displacements of the proof mass blocks 425 along the X-axis direction caused by the acceleration in the X direction. The out-of-plane displacement detection device 427 detects the rotations of the seesaw structures 422 caused by the movements of the proof mass blocks 425 along the Z-axis direction caused by the in-plane acceleration. Since the out-of-plane displacement detection devices 427 used for Z-axis detection in this embodiment are arranged in areas close to both sides of the rotation axis, the gain of the rotation to capacitance change in this embodiment will not be too high.

Apart from the above, other structures are the same as those in Embodiment 1, which will not be repeated herein.

Specifically, the in-plane displacement detection device 426 includes a plurality of the X-axis in-plane displacement detection devices 4261. The proof mass blocks 425 located on the two second side beams 4212 are provided with a plurality of mutually spaced first through openings 401, which extend through the proof mass blocks 425 along the third direction (Z-axis). Each of the first through openings 401 is provided with one of the first X-axis capacitance plates 42611 fixed on the proof mass blocks 425. Each of the second X-axis capacitance plates 42612, or one of the second X-axis capacitance plates 42612 and one of the third X-axis capacitance plates 42613 that form a differential arrangement therewith extend from the substrate to the same first through opening 401. Of course, the above structure is not limited that the proof mass blocks 425 are only located on the second side beam 4212, but refers to a part of the proof mass blocks 425 are located on the second side beam 4212.

The in-plane coupling elastic member 424 includes first elastic members 4241, which are located between the seesaw structures 422 and the first side beams 4211 and elastically connects the seesaw structures 422 and the first side beams 4211, so as to provides a flexural support for the linear movement of the proof mass blocks 425 along the first direction and co-couple the movement of the seesaw structures 422 along the third direction.

Embodiment 3

Figure 5:
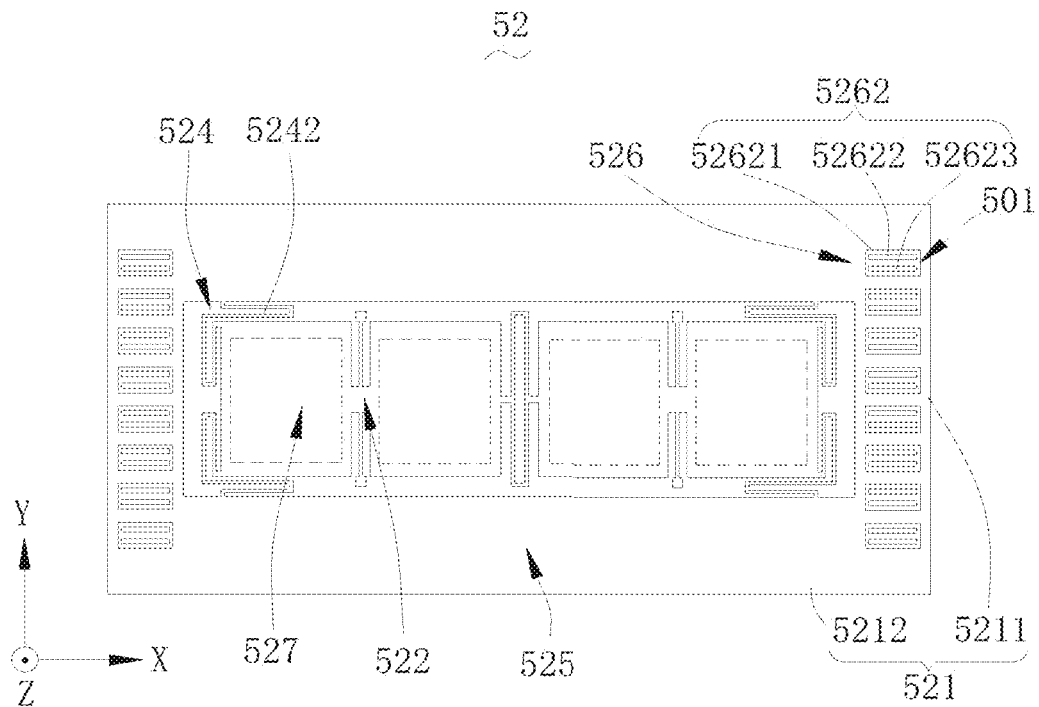
FIG. 5 is a schematic structural view of the sensing unit of the acceleration sensor according to Embodiment 3 of the present invention.

Referring to FIG. 5, this embodiment is basically the same as the above-mentioned Embodiment 1, except that in the sensing unit 52 in this embodiment, the out-of-plane displacement detection device 527 and the in-plane displacement detection device 526 jointly realize a dual-axis detection of Y-axis and Z-axis. That is, the in-plane displacement detection device 526 is only provided with the Y-axis in-plane displacement detection devices 5262 without providing with the X-axis in-plane displacement detection device. The proof mass blocks 525 have both the Y-axis and Z-axis linear movement modes. The Y-axis in-plane displacement detection devices 5262 detect the linear displacements of the proof mass blocks 525 along the Y-axis direction caused by the acceleration in the Y direction. The out-of-plane displacement detection devices 527 detect the rotations of the seesaw structures 422 caused by the movements of the proof mass blocks 525 along the Z-axis direction caused by the in-plane acceleration. Since the out-of-plane displacement detection devices 527 in this embodiment are arranged in areas close to both sides of the rotation axis, the gain of the rotation to capacitance change in this embodiment will not be too high.

Apart from the above, other structures are the same as those in Embodiment 1, which will not be repeated herein.

Specifically, the in-plane displacement detection device 526 includes a plurality of the Y-axis in-plane displacement detection devices 5262. The proof mass blocks 525 located on the two first beams 5211 are provided with a plurality of mutually spaced second through openings 501, which extend through the proof mass blocks 525 along the third direction (Z-axis). Each of the second through openings 501 is provided with one of the first Y-axis capacitance plates 52621 fixed on the proof mass blocks 525. Each of the second Y-axis capacitance plates 52622, or one of the second Y-axis capacitance plates 52622 and one of the third Y-axis capacitance plates 62623 that form a differential arrangement therewith extend from the substrate to the same second through opening 501.

The in-plane coupling elastic member 524 includes second elastic members 5242, which are located between the seesaw structures 522 and the second side beams 5212 and elastically connects the seesaw structures 522 and the second side beams 5212, so as to provides a flexural support for the linear movement of the proof mass blocks 525 along the second direction and co-couple the movement of the seesaw structures 522 along the third direction.

It should be noted that the X-axis in-plane displacement detection devices 261 and the Y-axis in-plane displacement detection devices 262 in Embodiment 1 are respectively the same as the X-axis in-plane displacement detection devices 4261 set in Embodiment 2 and the Y-axis in-plane displacement detection device 5262 set in Embodiment 3.

Embodiment 4

Figure 6:
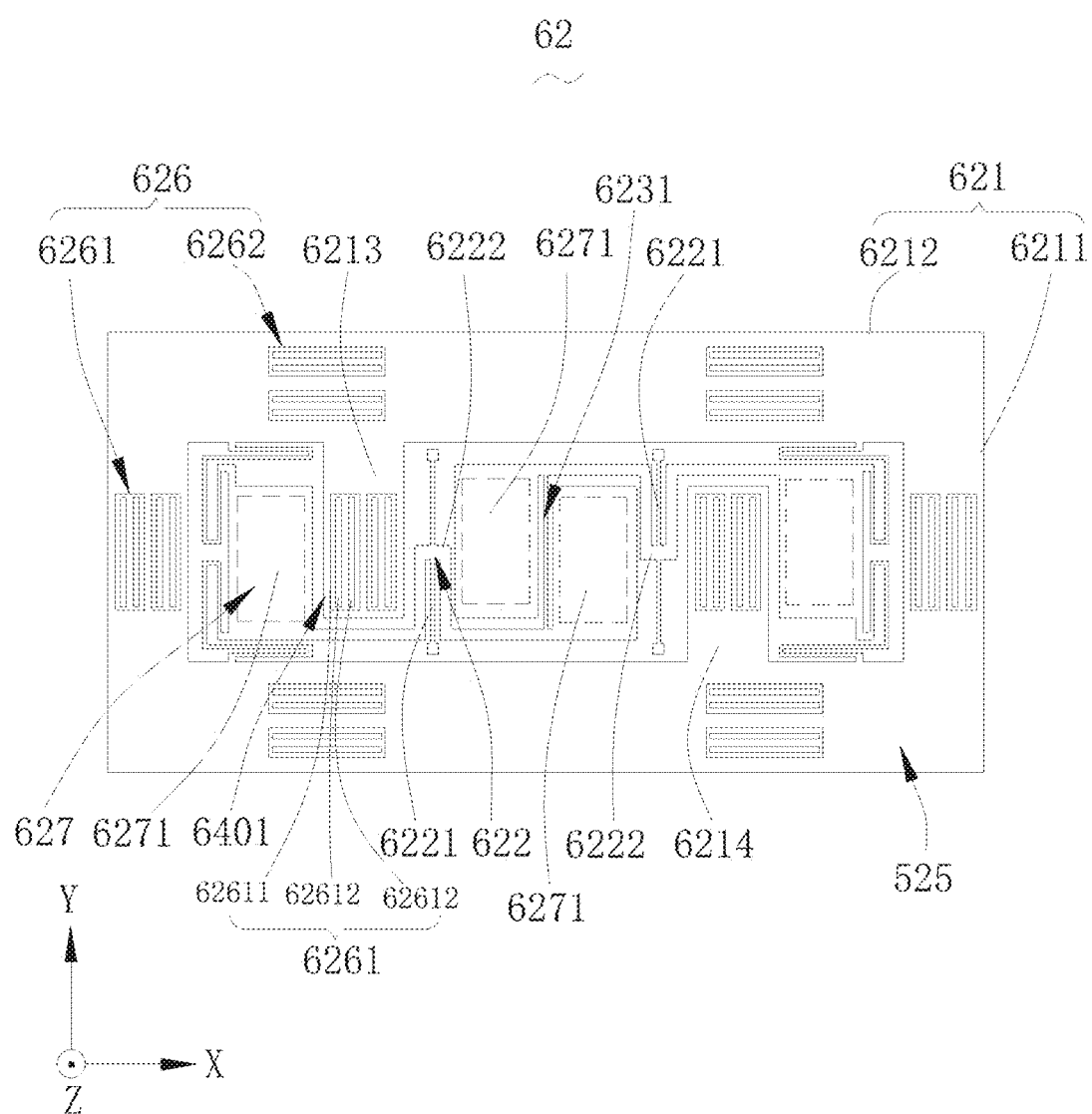
FIG. 6 is a schematic structural view of the sensing unit of the acceleration sensor according to Embodiment 4 of the present invention.

Referring to FIG. 6, this embodiment is basically the same as the above-mentioned Embodiment 1, except that the seesaw structures 622 are optimized in the sensing unit 62, and a nested structure is adopted, so that the out-of-plane displacement detection devices 627 are farther away from the rotation axis (torsion spring 6221) to obtain a larger gain. It should be noted that, the seesaw structures 622 are not strictly limited to be symmetrical along the rotation axis, and may also be asymmetrical, but the distribution of the main inertial proof mass structure is the same as this embodiment.

Apart from the above, other structures are the same as those in Embodiment 1, which will not be repeated herein.

Specifically, there are two the seesaw structures 622 mutually forming the nested structure, which are respectively defined as a first seesaw structure (a left seesaw structure in FIG. 6) and a second seesaw structure (a right seesaw structure in FIG. 6). The outer coupling unit 621 further includes a first outer coupling beam 6213 extending from the two second side beams 6212 to the first seesaw structure and a second outer coupling beam 6214 extending to the second seesaw structure. A torsion spring 6221 of the first seesaw structure and a torsion spring 6221 of the second seesaw structure are both arranged parallel to the second direction and staggered along the second direction. two ends of the connecting beam 6222 of the first seesaw structure and two ends of the connecting beam 6222 of the second seesaw structure are provided with the first Z-axis capacitance plate 6271.

The first outer coupling beam 6213 extends to a side of the torsion spring 6221 of the first seesaw structure away from the second seesaw structure and is spaced apart from the torsion spring 6221 of the first seesaw structure, and the second outer coupling beam 6214 extends to a side of the torsion spring 6221 of the second seesaw structure away from the first seesaw structure and is spaced apart from the torsion spring 6221 of the second seesaw structure.

The first Z-axis capacitance plate 6271 arranged on the first seesaw structure and close to the second seesaw structure is located on a side of the torsion spring of the second seesaw structure close to the first seesaw structure and is spaced apart from the torsion spring 6221 of the second seesaw structure, and the first Z-axis capacitance plate 6271 arranged on the second seesaw structure and close to the first seesaw structure is located on a side of the torsion spring 6221 of the first seesaw structure and is spaced apart from the torsion spring of the first seesaw structure, so as to form the nested structure of the two first Z-axis capacitance plates 6271.

The inner coupling elastic beam 6231 is located between the two first Z-axis capacitance plates 6271 that form the nested structure, and elastically connects the connecting beam 6222 of the first seesaw structure to the connecting beams 6222 of the second seesaw structure.

The arrangements of the in-plane displacement detection device 626 and the out-of-plane displacement detection device 627 are the same as those in the Embodiment 1. The in-plane displacement detection device 626 may only be provided with the X-axis in-plane displacement detection devices 6261 to realize a two-axis detection of the X-axis and the Z-axis, or may only be provided with the Y-axis in-plane displacement detection device 6262 to realize a two-axis detection of the Y-axis and the Z-axis, or may be provided with the X-axis in-plane displacement detection device 6261 and the Y-axis in-plane displacement detection device 6262 to realize a three-axis detection of X-axis, Y-axis and Z-axis. The principle is the same as that of the Embodiment 1.

Figure 7A:
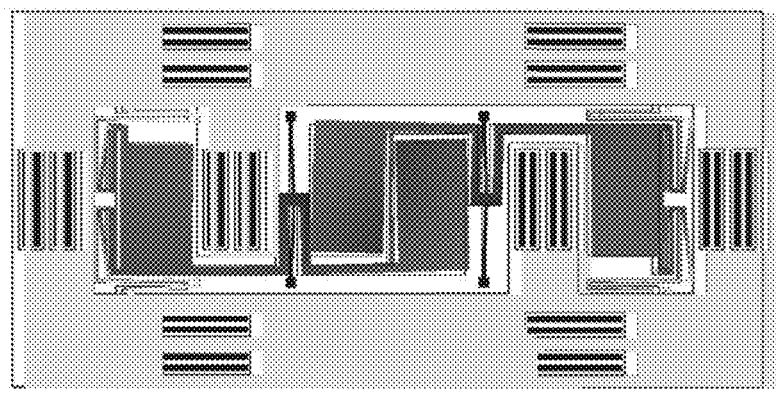
Figure 7B:
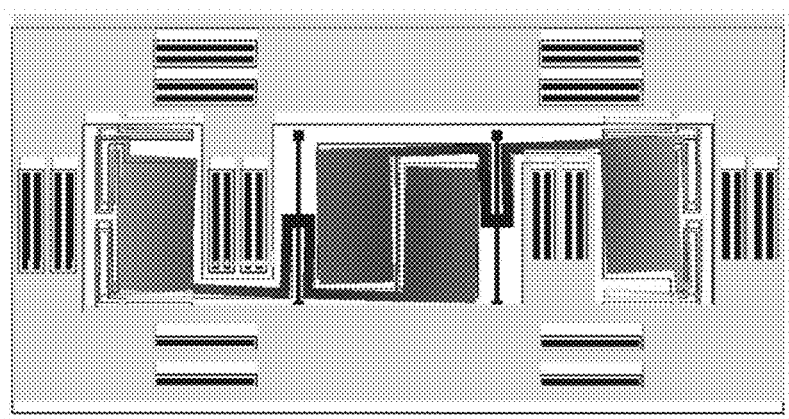
Figure 7C:
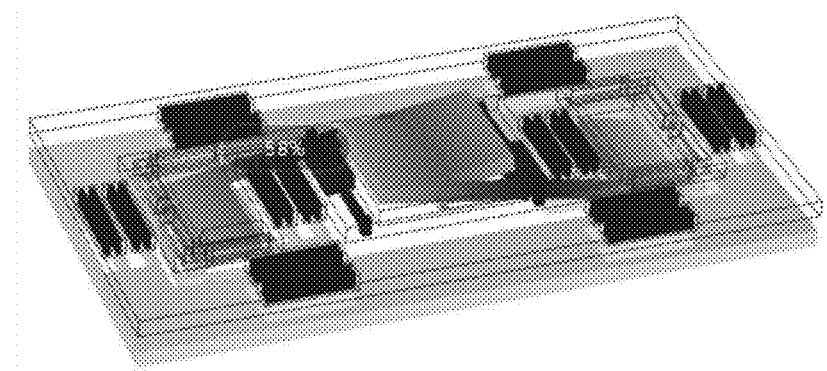

In this embodiment, the in-plane displacement detection device 626 includes X-axis in-plane displacement detection devices 6261 and Y-axis in-plane displacement detection devices 6262. Specific detection modes of the X-axis, Y-axis and Z-axis are illustrated in FIG. 7, in which FIG. 7A illustrates an X-axis detection mode, FIG. 7B illustrates a Y-axis detection mode, and FIG. 7C illustrates a Z-axis detection mode.

More preferably, when the in-plane displacement detection device 626 includes X-axis in-plane displacement detection devices 6261 configured to detect the linear movements of the proof mass blocks 625 along the first direction, the X-axis in-plane displacement detection devices 6261 are arranged on the first outer coupling beam 6213 and the second outer coupling beam 6214.

Specifically, the proof mass blocks 625 are also arranged on the first outer coupling beam 6213 and the second outer coupling beam 6214, and the proof mass blocks 625 located on the first outer coupling beam 6213 and the second outer coupling beam 6214 is provided with the first through hole 6401 penetrating therethrough along the third direction. Each of the second X-axis capacitance plates 62612, or, one of the second X-axis capacitance plates 62612 and one of the third X-axis capacitance plates 62613 that form a differential arrangement therewith extend from the substrate to the same the first through opening 6401.

Embodiment 5

Figure 8:
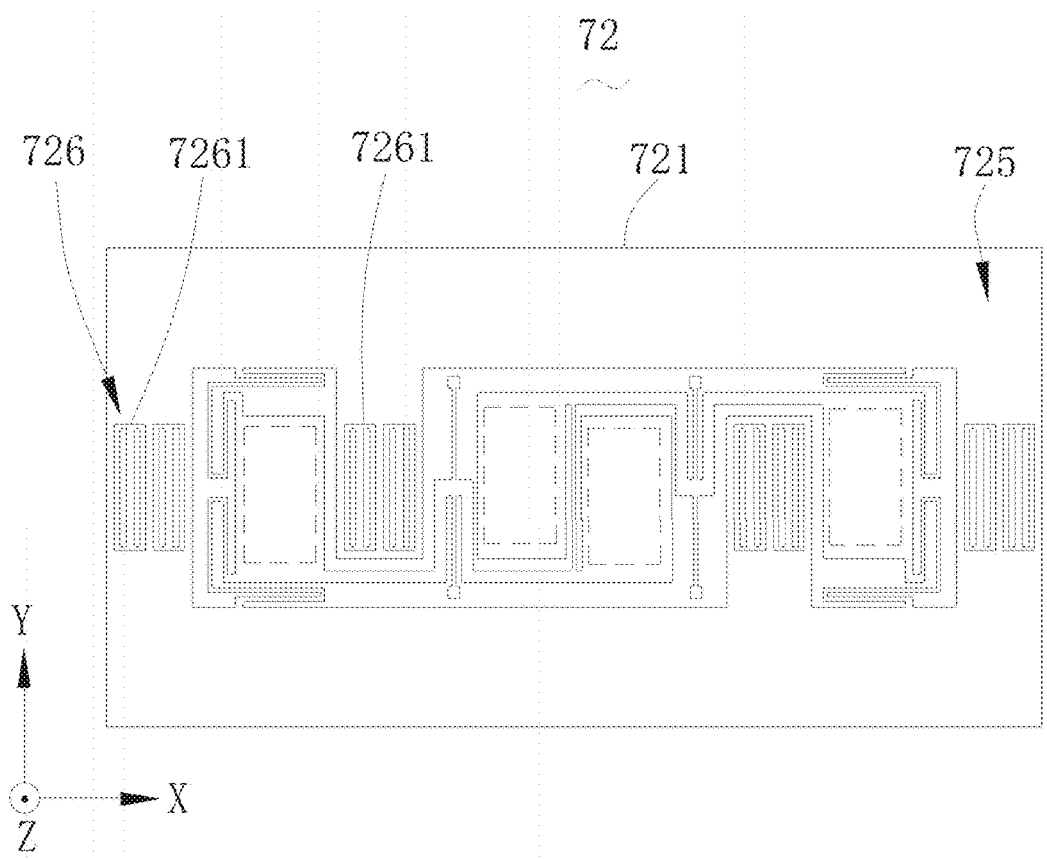
FIG. 8 is a schematic structural view of the sensing unit of the acceleration sensor according to Embodiment 5 of the present invention.

Referring to FIG. 8, this embodiment is basically the same as the Embodiment 4, except that in the sensing unit 72 in this embodiment, the in-plane displacement detection device 726 only includes X-axis in-plane displacement detection devices 7261 configured to detect the linear movement of the proof mass blocks 725 along the first direction, that is, to realize a two-axis detection of the X-axis and the Z-axis.

Apart from the above, other structures are the same as those in the Embodiment 4, which are not repeated herein.

Embodiment 6

Figure 9:
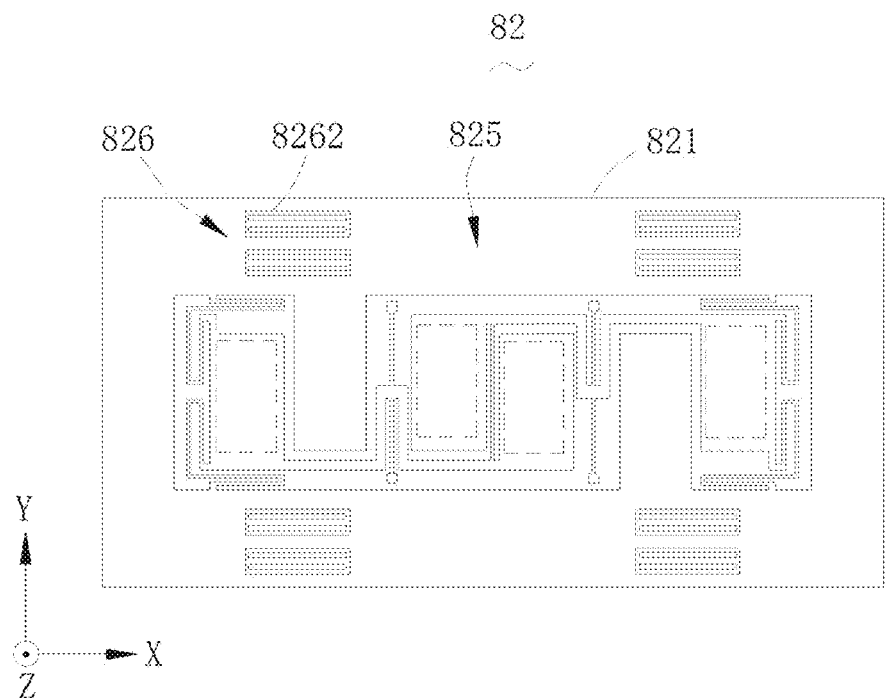
FIG. 9 is a schematic structural view of the sensing unit of the acceleration sensor according to Embodiment 6 of the present invention.

Referring to FIG. 9, this embodiment is basically the same as Embodiment 4, except that in the sensing unit 82 in this embodiment, the in-plane displacement detection device 826 only includes Y-axis in-plane displacement detection devices 8262 configured to detect the linear movements of the proof mass blocks 825 along the second direction, that is, to realize a two-axis detection of the Y-axis and the Z-axis.

Apart from the above, other structures are the same as those in Embodiment 4, and are not repeated here.

Embodiment 7

Figure 10:
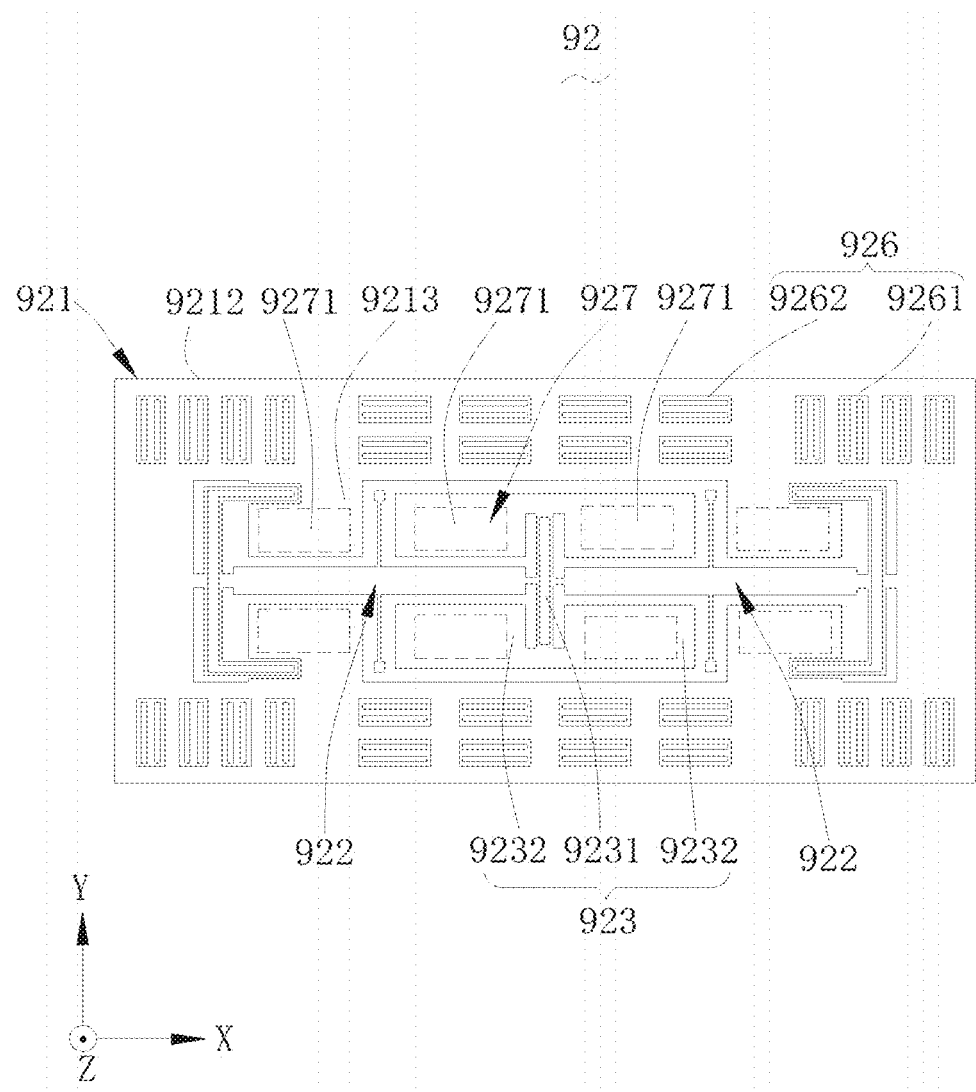
FIG. 10 is a schematic structural view of the sensing unit of the acceleration sensor according to Embodiment 7 of the present invention.

Referring to FIG. 10, this embodiment is basically the same as Embodiment 1, except that in the sensing unit 92 in this embodiment, the out-of-plane displacement detection devices 927 on the seesaw structures 922 are removed, and the out-of-plane displacement detection devices 927 are arranged on the inner and outer coupling structures, that is, arranged on the outer coupling unit 921 and the inner coupling unit 923. In this way, the out-of-plane displacement detection devices 927 translate along the Z-axis under an action of the in-plane acceleration, thereby improving the linearity of detection. Besides, the out-of-plane displacement detection devices 927 are distributed at the ends of the seesaw structures 922 to have a maximum displacement, thereby enabling a larger gain.

Apart from the above, other structures are the same as those in Embodiment 1, which are not repeated herein.

Specifically, there are two seesaw structures 922 arranged side by side along the first direction.

The outer coupling unit 921 further includes outer coupling walls 9213, and each of the second side beams 9212 extends toward the two seesaw structures to form two outer coupling walls 9213.

The inner coupling unit 923 further includes two inner coupling walls 9232 respectively fixed on two ends of the inner coupling elastic beam 9231 along the second direction. The inner coupling walls 9232, the seesaw structures 922 and the outer coupling units 921 are all arranged at intervals.

The first Z-axis capacitance plates 9271 are arranged on the outer coupling wall 9213 and the inner coupling wall 9232.

More preferably, each of the inner coupling walls 9232 is provided with two first Z-axis capacitance plates 9271 spaced apart at two ends of the corresponding inner coupling walls 9232 along the first direction. The two first Z-axis capacitance plates 9271 arranged at two ends of the same inner coupling wall 9232 are located between the two outer coupling walls 9213 extending from the same second side beam 9212.

The settings of the in-plane displacement detection device 926 and the out-of-plane displacement detection device 927 are the same as those in Embodiment 1. The in-plane displacement detection device 926 may only be provided with the X-axis in-plane displacement detection device 9261 to realize a two-axis detection of X-axis and the Z-axis, or may only be provided with the Y-axis in-plane displacement detection device 9262 to realize a two-axis detection of Y-axis and Z-axis, or may be provided the X-axis in-plane displacement detection device 9261 and the Y-axis in-plane displacement detection device 9262 to realize a three-axis detection of X-axis, Y-axis and Z-axis. The principle is the same as that of Embodiment 1.

Figure 11A:
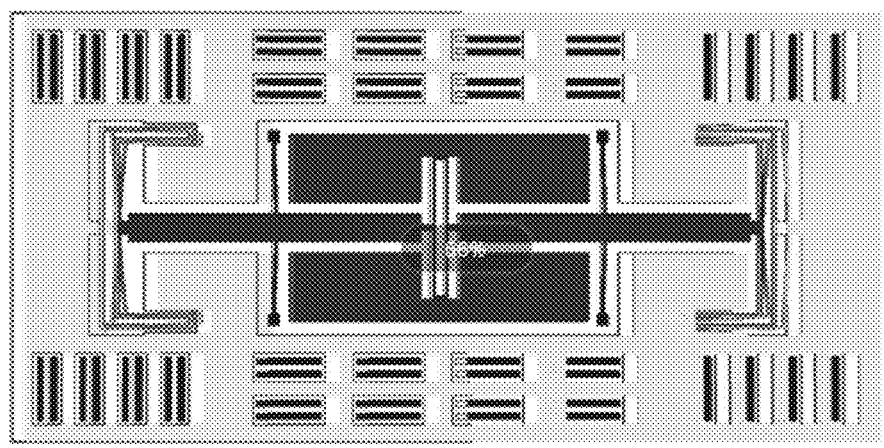
Figure 11B:
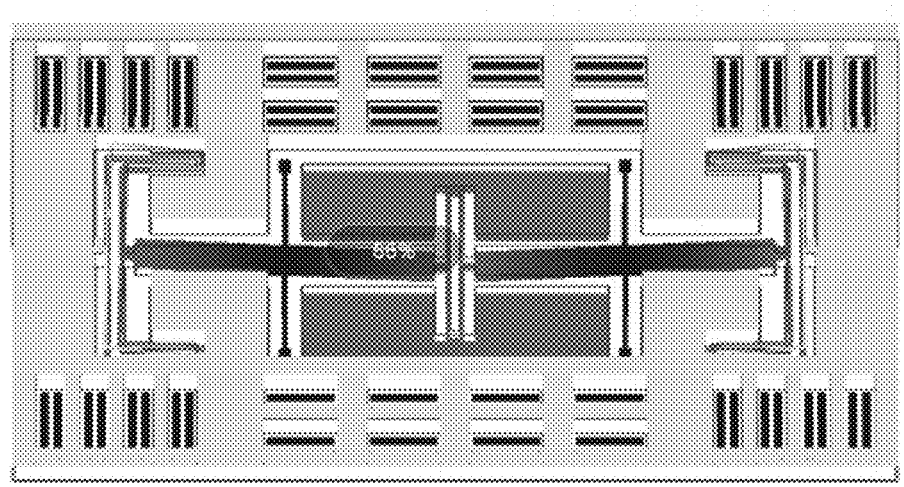
Figure 11C:
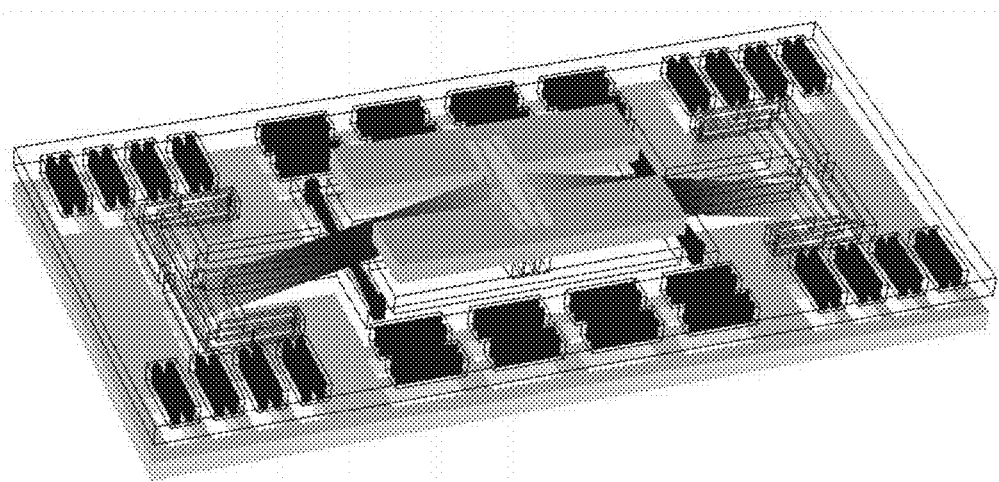

In this embodiment, the in-plane displacement detection device 926 includes X-axis in-plane displacement detection devices 9261 and Y-axis in-plane displacement detection devices 9262. Specific detection modes of the X-axis, Y-axis and Z-axis are illustrated in FIG. 11, in which FIG. 11A illustrates an X-axis detection mode, FIG. 11B illustrates a Y-axis detection mode, and FIG. 11C illustrates a Z-axis detection mode.

Embodiment 8

Figure 12:
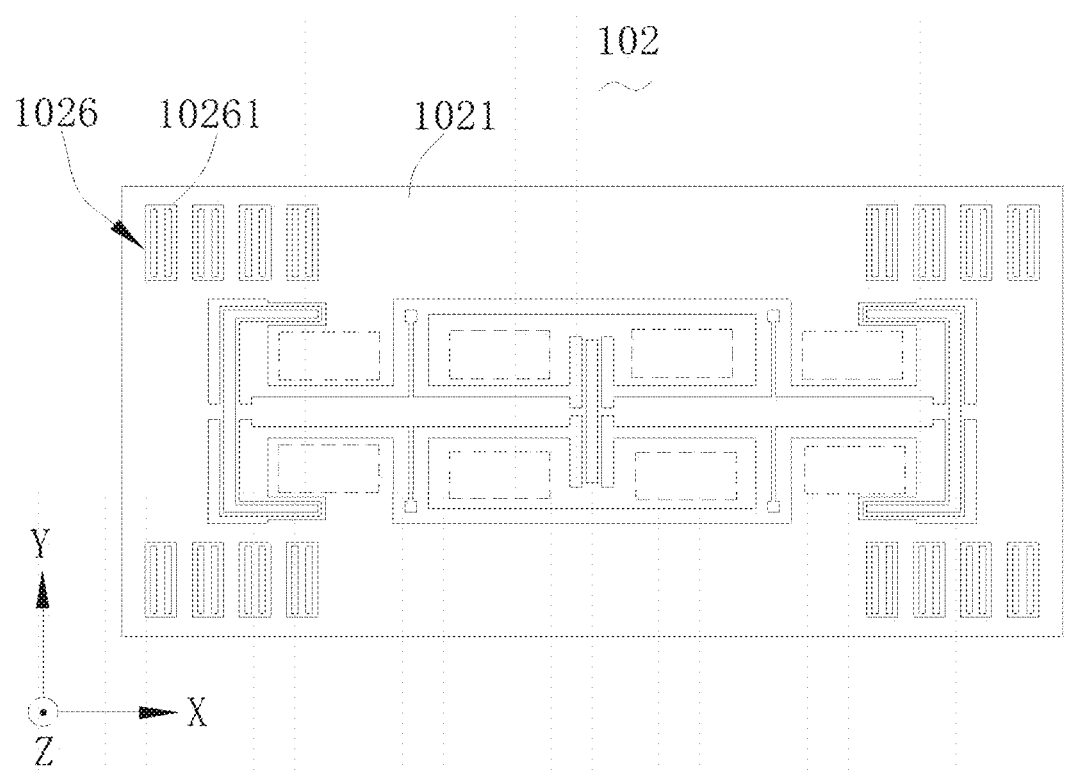
FIG. 12 is a schematic structural view of the sensing unit of the acceleration sensor according to Embodiment 8 of the present invention.

Referring to FIG. 12, this embodiment is basically the same as Embodiment 7, except that in the sensing unit 102 of this embodiment, the in-plane displacement detection device 1026 only includes X-axis in-plane displacement detection devices 10261 configured to detect the linear movements of the outer coupling units 1021 along the first direction, that is, to realize a two-axis detection of the X-axis and the Z-axis.

Apart from the above, other structures are the same as those in Embodiment 7, which are not repeated herein.

Embodiment 9

Figure 13:
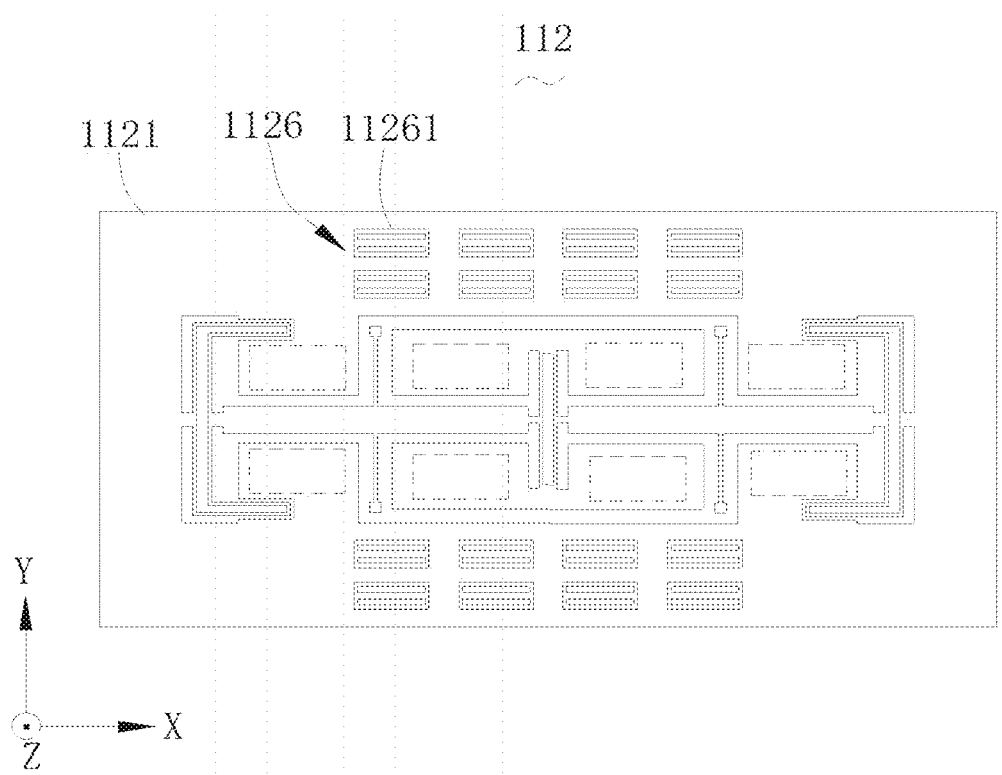
FIG. 13 is a schematic structural view of the sensing unit of the acceleration sensor according to Embodiment 9 of the present invention.

Referring to FIG. 13, this embodiment is basically the same as Embodiment 7, except that in the sensing unit 112 of this embodiment, the in-plane displacement detection device 1126 only includes Y-axis in-plane displacement detection devices 11262 configured to detect the linear movements of the outer coupling units 1021 along the second direction, that is, to realize a two-axis detection of the Y-axis and the Z-axis.

Apart from the above, other structures are the same as those in Embodiment 7, which are not repeated herein.

Embodiment 10

Figure 14:
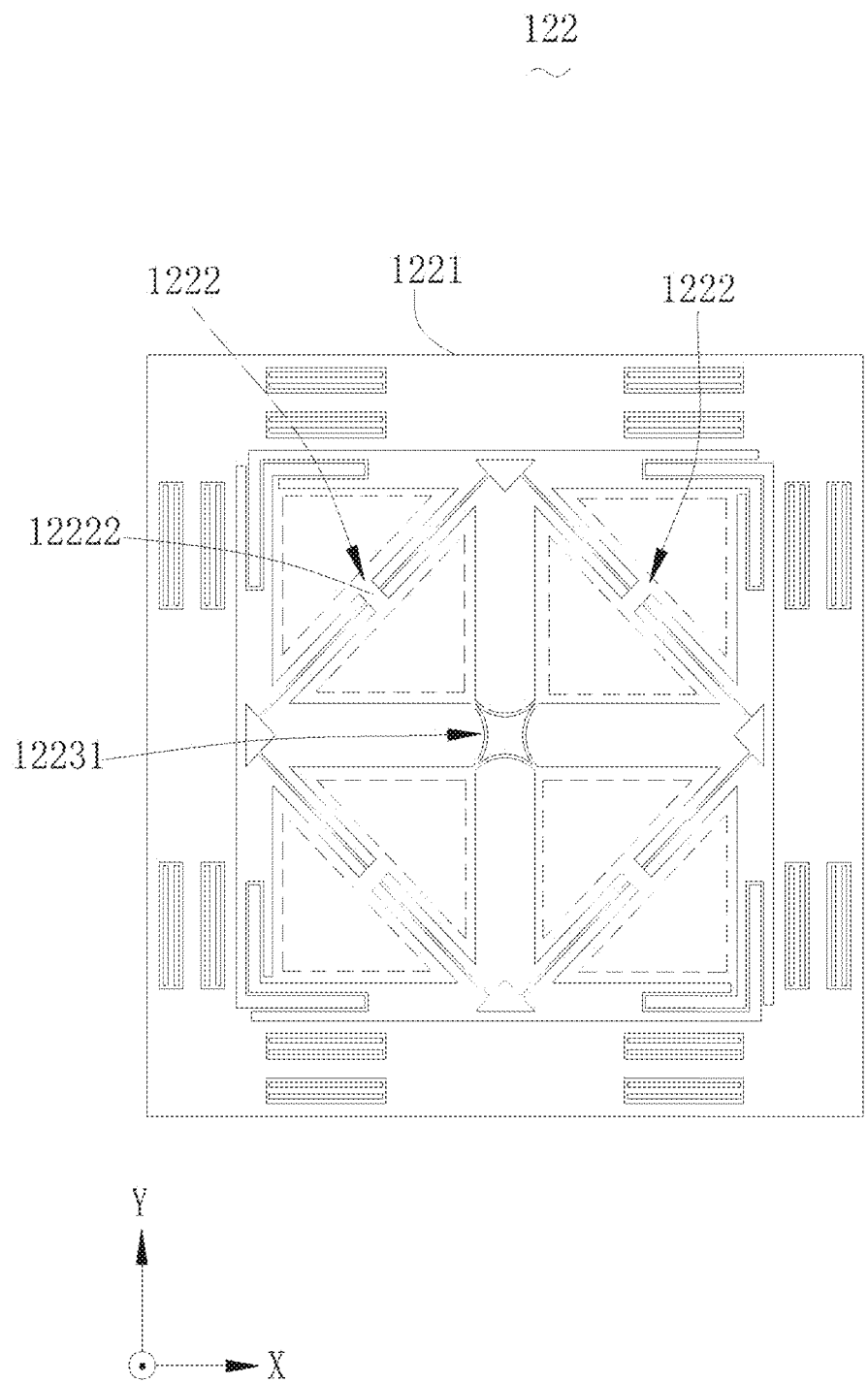
FIG. 14 is a schematic structural view of the sensing unit of the acceleration sensor according to Embodiment 10 of the present invention.

Referring to FIG. 14, this embodiment is basically the same as the first embodiment, except that the sensing unit 122 adopts four seesaw structures 1222 as supports. The arrangement of the four seesaw structures 1222 makes the structure more reasonable and better, to better suppress the motion of non-sensitive axis modes, so that the accelerometer has a better cross-axis mode suppression capability, and more capacitance plates provide greater gain.

Specifically, the outer coupling units 1221 are square, and there are four seesaw structures 1222 arranged in the outer coupling units 1221 in a matrix. The inner coupling elastic beam 12231 is located in a middle of the four seesaw structures 1222 and elastically connects the four seesaw structures 1222. Each of the two seesaw structures 1222 is regarded as a group and is located on one of diagonal lines of the outer coupling unit 1221, and the connecting beams 12222 of the group of seesaw structures 1222 are parallel to the diagonal line.

Apart from the above, other structures are the same as those in Embodiment 1, which are not repeated herein.

Embodiment 11

Figure 15:
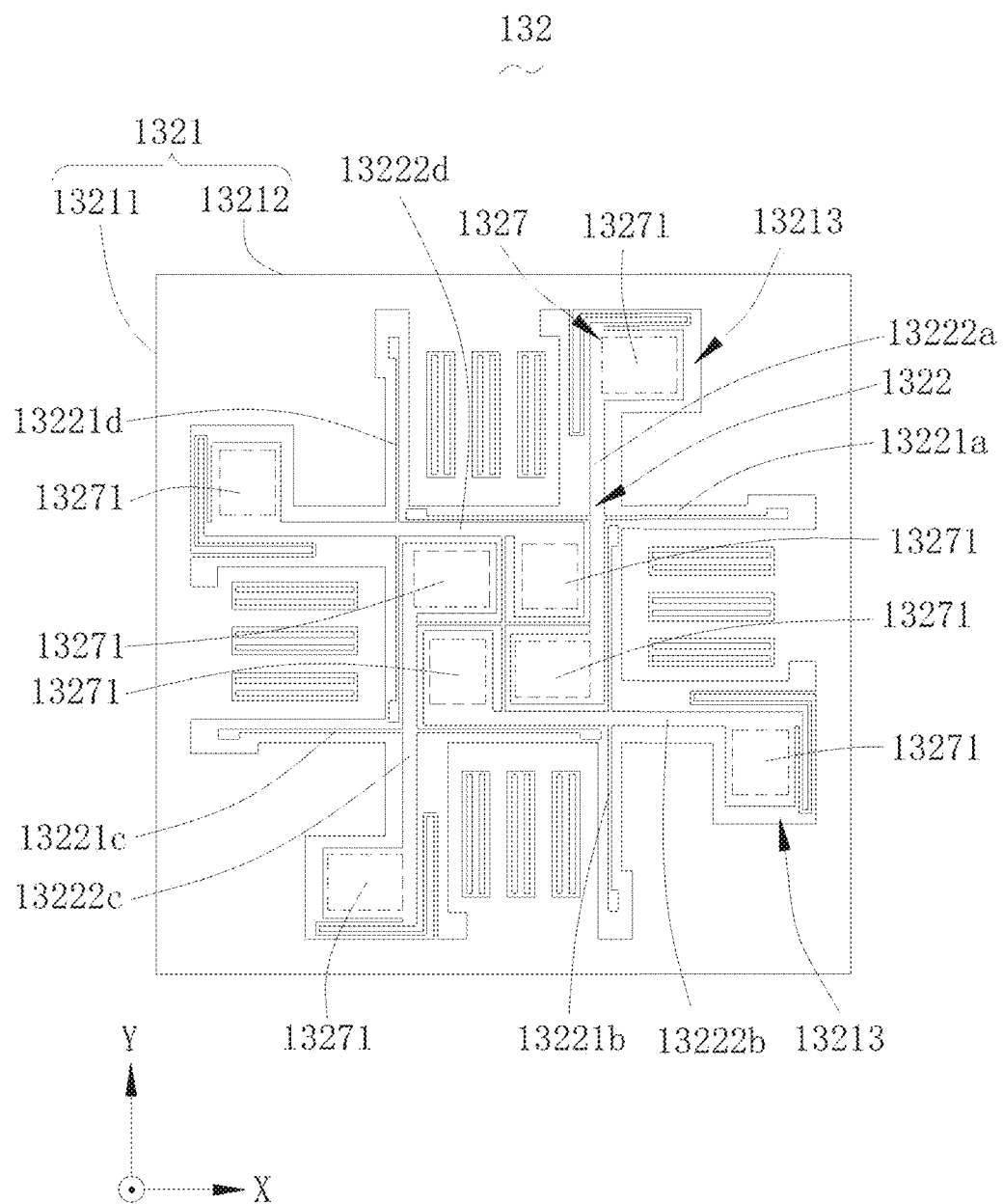
FIG. 15 is a schematic structural view of the sensing unit of the acceleration sensor according to Embodiment 11 of the present invention.

As shown in FIG. 15, this embodiment is basically the same as Embodiment 10, except that in the sensing unit 132, on the basis of Embodiment 10, a distance of the first Z-axis capacitance plates 13271 configured to detect the acceleration in the out-of-plane displacement detection device 1327 is extended, so that the first Z-axis capacitance plate 13271 is further away from the rotation axis, so as to obtain a greater gain.

Specifically, there are four seesaw structures 1322 mutually forming a nested structure, which are defined as a first seesaw structure, a second seesaw structure, a third seesaw structure, and a fourth seesaw structure in a clockwise order. The outer coupling unit 1321 further includes four accommodating grooves 13213 recessed outward from inner sides of the two first side beams 13211 and inner sides of the two second side beams 13212. Of course, when the proof mass blocks are arranged on the outer coupling unit 1321, it can also be easily understood that the accommodating grooves 13213 are formed as recessions of the proof mass blocks.

The torsion spring 13221*a* of the first seesaw structure and the torsion spring 13221*c* of the third seesaw structure are arranged parallel to the first direction and staggered along the second direction.

Two ends of the connecting beam 13222*a* of the first seesaw structure are provided with the first Z-axis capacitance plate 13271, and the first Z-axis capacitance plate 13271 at one end is located on the accommodating groove 13213 formed by a recession of one of the second sides beam 13212, and the first Z-axis capacitance plate 13271 at the other end is located in the inner side of the outer coupling unit 1321.

Two ends of the connecting beam 13222*c* of the third seesaw structure are provided with the first Z-axis capacitance plate 13271, and the first Z-axis capacitance plate 13271 at one end is located at the other of the second Z-axis capacitance plate 13271. The side beam 13212 is recessed into the accommodating groove 13213, and the first Z-axis capacitance plate 13271 at the other end is located at the inner side of the outer coupling unit 1321.

A combined structure including the first seesaw structure and the first Z-axis capacitance plates 13271 arranged at two ends of the first seesaw structure, and a combined structure comprising the third seesaw structure and the first Z-axis capacitance plates 13271 arranged at two ends of the third seesaw structure are center-symmetrical with a geometric center of the outer coupling unit 1321.

Similarly, the torsion spring 13221*b* of the second seesaw structure and the torsion spring 13221*d* of the fourth seesaw structure are both arranged parallel to the second direction and staggered along the first direction.

Two ends of the connecting beam 13222*b* of the second seesaw structure are provided with the first Z-axis capacitance plate 13271, and the first Z-axis capacitance plate 13271 at one end is located on the accommodating groove formed by a recession of one of the first side beams 13211, and the first Z-axis capacitance plate 13271 at the other end is located at the inner side of the outer coupling unit 1321.

Both ends of the connecting beam 13222d of the fourth seesaw structure are provided with the first Z-axis capacitance plate 13271, and the first Z-axis capacitance plate 13271 at one end is located at the other of the first Z-axis capacitance plates 13271. The side beam 13211 is recessed into the accommodating groove 13213, and the first Z-axis capacitance plate 13271 at the other end is located at the inner side of the outer coupling unit 1321.

A combined structure including the second seesaw structure and the first Z-axis capacitance plates 13271 arranged at two ends of the second seesaw structure, and a combined structure comprising the fourth seesaw structure and the first Z-axis capacitance plates 13271 arranged at two ends of the third seesaw structure are center-symmetrical with a geometric center of the outer coupling unit 1321.

The four first Z-axis capacitance plates 13271 located at the inner side of the outer coupling unit 1321 are sequentially arranged in a matrix.

Apart from the above, other structures are the same as those in Embodiment 10, which will not be repeated herein.

Embodiment 12

Figure 16:
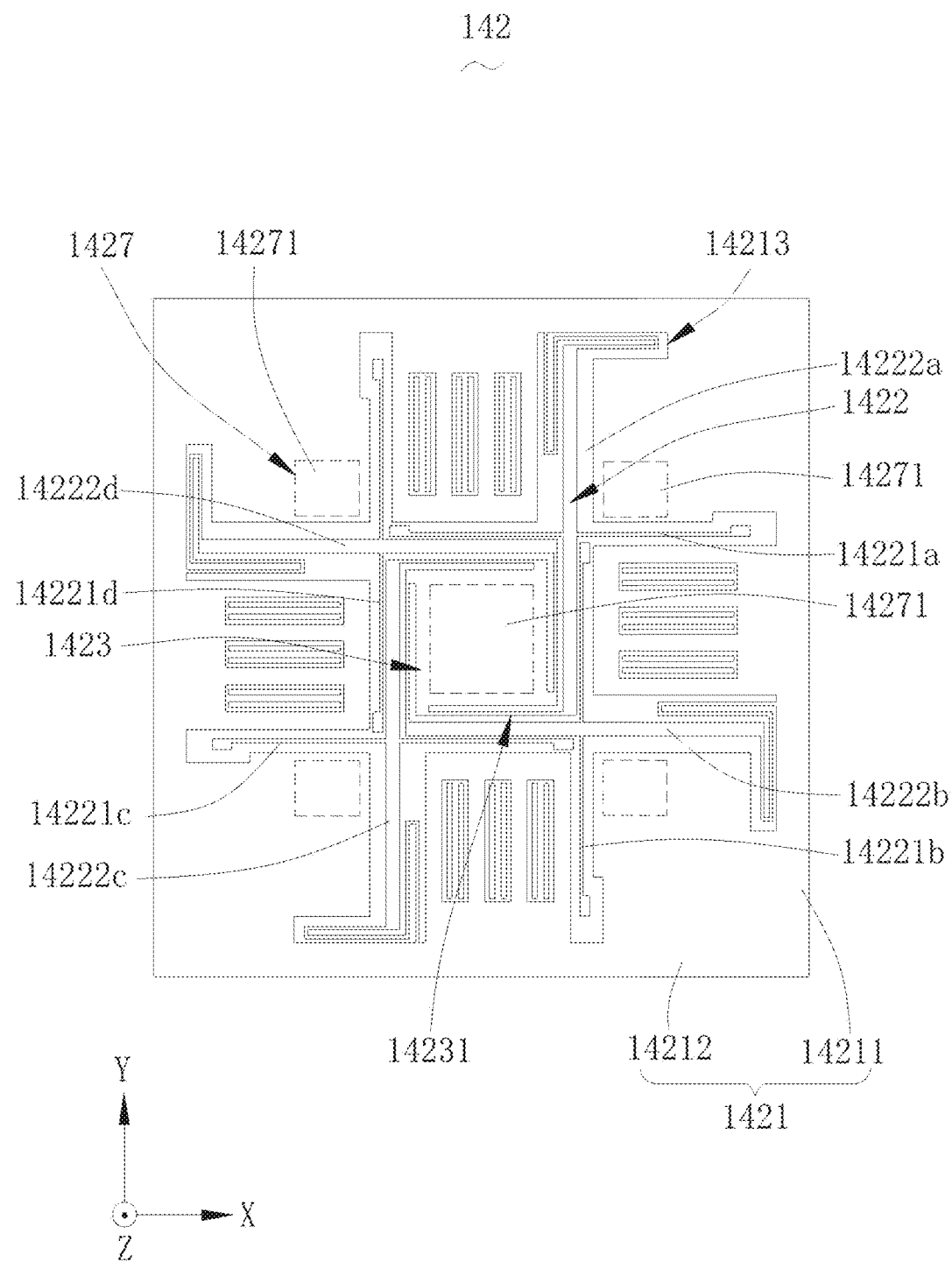
FIG. 16 is a schematic structural view of the sensing unit of the acceleration sensor according to Embodiment 12 of the present invention.

As shown in FIG. 16, this embodiment is basically the same as Embodiment 11, except that in the sensing unit 142, on the basis of Embodiment 11, the first Z-axis capacitance plates 14271 on the seesaw structures 1422 are removed, and the first Z-axis capacitance plates 14271 of the out-of-plane displacement detection device 1427 are arranged on the inner and outer coupling structures, that is, arranged on the outer coupling unit 1421 and the inner coupling unit 1423. In this way, the first Z-axis capacitance plates 14271 translate along the Z-axis under an action of an in-plane acceleration, thereby improving a linearity of detection. Besides, the first Z-axis capacitance plates 14271 are distributed at ends of the seesaw structures 1422 to have a maximum displacement, thereby obtaining a greater gain.

Specifically, there are four seesaw structures 1422, which are defined as a first seesaw structure, a second seesaw structure, a third seesaw structure, and a fourth seesaw structure in a clockwise order. The outer coupling unit 1421 further includes four accommodating grooves 14213 recessed outward from inner sides of the two first side beams 14211 and inner sides of the two second side beams 14212 respectively.

The torsion spring 14221a of the first seesaw structure and the torsion spring 14221c of the third seesaw structure are both arranged parallel to the first direction and staggered along the second direction.

One end of the connecting beam 14222a of the first seesaw structure extends into the accommodating groove 14213 recessed in one of the second side beams 14212, and the other end extends to the inner side of the outer coupling unit 1421.

One end of the connecting beam 14222c of the third seesaw structure extends into the accommodating groove 14213 formed by a recession of the second side beam 14212, and the other end thereof extends to an inner side of the outer coupling unit 1421.

The first seesaw structure and the third seesaw structure are central-symmetric with a geometric center of the outer coupling unit 1421.

Similarly, the torsion spring 14221b of the second seesaw structure and the torsion spring 14221d of the fourth seesaw structure are both arranged parallel to the second direction and staggered along the first direction.

One end of the connecting beam 14222b of the second seesaw structure extends into the accommodating groove 14213 formed by a recession of one of the first side beams 14211, and the other end thereof extends to the inner side of the outer coupling unit 1421.

One end of the connecting beam 14222d of the fourth seesaw structure extends into the accommodating groove 14213 formed by the recession of the other one of the first side beams 14211, and the other end thereof extends to the inner side of the outer coupling unit 1421.

The second seesaw structure and the fourth seesaw structure are central-symmetric with the geometric center of the outer coupling unit 1421.

The first Z-axis capacitance plates 14271 are respectively arranged on the outer coupling unit 1421 and the inner side of the outer coupling unit 1421, and the first Z-axis capacitance plates 14271 located at the inner side of the outer coupling unit 1421 are located at ends of the four seesaw structures 1422 that are close to each other, and are respectively connected to the four seesaw structures 1422 through the inner coupling elastic beams 14231.

Apart from the above, other structures are the same as those in Embodiment 11, which will not be repeated herein.

Compared with the related art, in the acceleration sensor of the present invention, the sensing unit includes at least two seesaw structures fixed on the substrate through anchor blocks, and the seesaw structures are located at the inner side of the outer coupling unit. The adjacent seesaw structures are connected through the inner coupling unit, so as to generate the co-coupling when the seesaw structures move along a third direction (the Z-axis direction) and weaken a rotation in a surface of the seesaw structures. Through the design of the inner coupling unit, the seesaw structures can move along the third direction. Each seesaw structure is connected to the outer coupling unit through an in-plane coupling elastic member, and is configured to provide the flexible support for the linear movements of the proof mass blocks along the first direction (X-axis direction) and co-couple the movements of the seesaw structures along the second direction (Y-axis direction). Through the design of the in-plane coupling elastic member, the outer coupling unit can generate the linear movement along the first direction and/or the third direction. The in-plane displacement detection device is arranged on the proof mass blocks, and is configured to detect the linear movements of the proof mass blocks along the first direction, and/or configured to detect the linear movements of the proof mass blocks along the second direction. The out-of-plane displacement detection devices are arranged on the outer coupling unit and/or the seesaw structures and/or the inner coupling unit, and are configured to detect the linear movements of the seesaw structures along the third direction, thereby realizing a multi-axis detection function. Since the proof mass blocks are attached and fixed on the outer coupling unit or the inner coupling unit or the seesaw structures, after the above structure is set, the seesaw structures are configured as a supporting structure of the proof mass blocks, so that the proof mass blocks move along the Z-axis under an action of an in-plane direction (Z direction) acceleration, and the movement displacement greatly improves a linearity of the displacement detection. The above structure makes the multi-axis detection of the X/Y-axis and the Z-axis share one proof mass blocks, so that the proof mass blocks can be made larger to improve the detection accuracy. A mass center of the seesaw structures is close to or at a rotation axis. This distribution method of the proof mass blocks makes the mass more concentrated, the structure is more reasonable, and the parasitic modes are less, so that the acceleration sensor provided by the embodiment of the present invention has a compact structure and a small size.

Described above are only embodiments of the present invention. It should be noted that those of ordinary skill in the art can further make improvements without departing from the concept of the present invention. These improvements shall all fall within the protection scope of the present invention.

What is claimed is:

1. An acceleration sensor, comprising:
   a substrate;
   a sensing unit arranged on the substrate; and
   a plurality of anchor blocks fixed on the substrate and located at a same level as the sensing unit, and the anchor blocks are configured to fixed the sensing unit on the substrate;
   wherein the sensing unit comprises:
   an outer coupling unit, wherein the outer coupling unit has a ring structure, and comprises two first side beams spaced apart and opposite to each other along a first direction and two second side beams spaced apart and opposite to each other along a second direction; the outer coupling unit is stacked on the substrate, and a plane where the first direction and the second direction are located is parallel to the substrate;
   at least two seesaw structures, wherein the at least two seesaw structures are arranged at intervals on an inner side of the outer coupling unit, and each of the seesaw structures comprises two spaced torsion springs arranged parallel to the substrate and a connecting beam parallel to the substrate and fixed on the torsion spring; the connecting beam is perpendicular to the torsion springs, ends of the two torsion springs that are close to each other are connected to the connecting beam, and ends of the torsion springs away from each other are fixed on two of the plurality of anchor blocks and further fixed on the substrate through the two anchor blocks;
   an inner coupling unit, comprising an inner coupling elastic beam, wherein the inner coupling elastic beam is located between two adjacent seesaw structures of the at least two seesaw structures, and elastically connects the two adjacent seesaw structures of the at least two seesaw structures; the inner coupling elastic beam is configured to generate a co-coupling to weaken a rotation in a surface of the seesaw structures when the seesaw structures moves along a third direction; wherein the first direction, the second direction and the third direction are perpendicular to each other;
   proof mass blocks fixed on the outer coupling unit;
   in-plane coupling elastic members, wherein the in-plane coupling elastic members are located at ends of the seesaw structures away from the inner coupling elastic beam and is elastically connected to the seesaw structures to the outer coupling unit, and are configured to provide a flexible support for linear movements of the proof mass blocks along the first direction and/or the second direction and co-couple movements of the seesaw structures along the third direction;
   an in-plane displacement detection device arranged on the proof mass blocks, and configured to detect the linear movements of the proof mass blocks along the first direction and/or configured to detect the linear movements of the proof mass blocks along the second direction; and
   a plurality of out-of-plane displacement detection devices arranged on the outer coupling unit and/or the seesaw structures and/or the inner coupling unit, and configured to detect movements of the proof mass blocks and/or the seesaw structures and/or the inner coupling unit along the third direction;
   wherein the in-plane displacement detection device is a displacement-capacitance detection device, comprising a plurality of X-axis in-plane displacement detection devices configured to detect the linear movements of the proof mass blocks along the first direction, and/or a plurality of Y-axis in-plane displacement detection devices configured to detect the linear movements of the proof mass blocks along the second direction;
   each of the X-axis in-plane displacement detection devices comprises a first X-axis capacitance plate located on the proof mass blocks, a second X-axis capacitance plate anchored on the substrate and configured to form a detection capacitance structure with the first X-axis capacitance plate, and a third X-axis horizontal capacitance plate anchored on the substrate, forming a detection capacitance structure with the first X-axis capacitance plate and differentially arranged with the second X-axis capacitance plate;
   the first X-axis capacitance plate extends along the second direction, and the second X-axis capacitance plate and the third X-axis capacitance plate are relatively spaced along the first direction;
   each of the Y-axis in-plane displacement detection devices comprises a first Y-axis capacitance plate located on the proof mass blocks, a second Y-axis capacitance plate anchored on the substrate and configured to form a detection capacitance structure with the first Y-axis capacitance plate, and a third Y-axis horizontal capacitance plate anchored on the substrate, forming a detection capacitance structure with the first Y-axis capacitance plate and differentially arranged with the second Y-axis capacitance plate; and
   the first Y-axis capacitance plate extends along the first direction, and the second Y-axis capacitance plate and the third Y-axis capacitance plate are relatively spaced along the second direction.

2. The acceleration sensor of claim 1, wherein the in-plane displacement detection device is a displacement-capacitance detection device or an optical displacement detection device, and the plurality of out-of-plane displacement detection devices is a displacement-capacitance detection device or an optical displacement detection device.

3. The acceleration sensor of claim 2, wherein the plurality of out-of-plane displacement detection devices are displacement-capacitance detection devices, and each of the out-of-plane displacement detection devices comprises a first Z-axis capacitance plate arranged on one side of the outer coupling unit and/or the seesaw structures and/or the inner coupling unit along the third direction, and a second Z-axis capacitance plate anchored on the substrate and forming a detection capacitance structure with the first Z-axis capacitance plate; or
   the plurality of out-of-plane displacement detection devices are displacement-capacitance detection device, and each of the out-of-plane displacement detection devices comprises a first Z-axis capacitance plate arranged on one side of the outer coupling unit and/or the seesaw structures and/or the inner coupling unit along the third direction, a second Z-axis capacitance plate anchored on the substrate and forming a detection capacitance structure with the first Z-axis capacitance plate, and a third Z-axis horizontal capacitance plate arranged on the other side of the outer coupling unit and/or the seesaw structures and/or the inner coupling unit along the third direction, forming a detection capacitance structure with the second Z-axis capacitance plate and differentially arranged with the first Z-axis capacitance plate.

4. The acceleration sensor of claim 2, wherein the first Z-axis capacitance plate is fixed on two ends of the connecting beam of the seesaw structures.

5. The acceleration sensor of claim 2, wherein the in-plane displacement detection device comprises the plurality of X-axis in-plane displacement detection devices; the proof mass blocks located on the two second side beams are provided with a plurality of spaced first through openings, and the first through openings extend through the proof mass blocks along the third direction; each of the first through openings is provided with one of the first X-axis capacitance plates fixed on the proof mass blocks; each of the second X-axis capacitance plates, or one of the second X-axis capacitance plates and one of the third X-axis capacitance plates that form a differential arrangement therewith extend from the substrate to the same first through opening.

6. The acceleration sensor of claim 5, wherein the in-plane coupling elastic members comprises a first elastic member, wherein the first elastic member is located between the seesaw structures and the first side beams and elastically connects the seesaw structures to the first side beams, which is configured to provide a flexible support for the linear movements of the proof mass blocks along the first direction and co-couple the movements of the seesaw structures along the third direction.

7. The acceleration sensor of claim 2, wherein the in-plane displacement detection device comprises the plurality of the Y-axis in-plane displacement detection devices; the proof mass blocks located on the two second side beams are provided with a plurality of spaced second through openings, and the second through openings extend through the proof mass blocks along the third direction; each of the second through openings is provided with one of the second Y-axis capacitance plates fixed on the proof mass blocks; each of the second Y-axis capacitance plates, or one of the second Y-axis capacitance plates and one of the third Y-axis capacitance plates that form a differential arrangement therewith extend from the substrate to the same second through opening.

8. The acceleration sensor of claim 7, wherein the in-plane coupling elastic members comprises a second elastic member, wherein the second elastic member is located between the seesaw structures and the second side beams and elastically connects the seesaw structures to the second side beams, which is configured to provide a flexible support for the linear movements of the proof mass blocks along the second direction and co-couple the movements of the seesaw structures along the third direction.

9. The acceleration sensor of claim 3, wherein there are two seesaw structures mutually forming a nested structure, which are respectively defined as a first seesaw structure and a second seesaw structure; the outer coupling unit further comprises a first outer coupling beam extending from the two second side beams to the first seesaw structure and a second outer coupling beam extending to the second seesaw structure; a torsion spring of the first seesaw structure and a torsion spring of the second seesaw structure are both arranged parallel to the second direction and staggered along the second direction; two ends of a connecting beam of the first seesaw structure and two ends of a connecting beam of the second seesaw structure are all provided with the first Z-axis capacitance plate;
the first outer coupling beam extends to a side of the torsion spring of the first seesaw structure away from the second seesaw structure and is spaced apart from the torsion spring of the first seesaw structure, and the second outer coupling beam extends to a side of the torsion spring of the second seesaw structure away from the first seesaw structure and is spaced apart from the torsion spring of the second seesaw structure;
the first Z-axis capacitance plate arranged on the first seesaw structure and close to the second seesaw structure is located on a side of the torsion spring of the second seesaw structure close to the first seesaw structure and is spaced apart from the torsion spring of the second seesaw structure, and the first Z-axis capacitance plate arranged on the second seesaw structure and close to the first seesaw structure is located on a side of the torsion spring of the first seesaw structure and is spaced apart from the torsion spring of the first seesaw structure, so as to form the nested structure of the two first Z-axis capacitance plates; and
the inner coupling elastic beam is located between the two first Z-axis capacitance plates that form the nested structure, and elastically connects the connecting beam of the first seesaw structure to the connecting beam of the second seesaw structure.

10. The acceleration sensor of claim 9, wherein when the in-plane displacement detection device comprises the X-axis in-plane displacement detection devices configured to detect the linear movements of the proof mass blocks along the first direction, the X-axis in-plane displacement detection devices are arranged on the first outer coupling beam and the second outer coupling beam; the first outer coupling beam and the second outer coupling beam are both provided with the proof mass blocks; the proof mass blocks arranged on the first outer coupling beam and the second outer coupling beam are provided with the first through openings extending the proof mass blocks along the third direction, an inner side of the first through openings is provided with the first X-axis capacitance plate; each of the second X-axis capacitance plates, or one of the second X-axis capacitance plates and one of the third X-axis capacitance plates that form a differential arrangement therewith extend from the substrate into the same first through hole.

11. The acceleration sensor of claim 2, wherein there are two seesaw structures arranged side by side along the first direction;
the outer coupling unit further comprises outer coupling walls, and each of the two second side beams respectively extends to the two seesaw structures to form two of the outer coupling walls;
the inner coupling unit further comprises two inner coupling walls respectively fixed on two ends of the inner coupling elastic beam along the second direction, and the inner coupling walls are spaced apart from the seesaw structures and the outer coupling unit; and
the first Z-axis capacitance plates are respectively arranged on the outer coupling walls and the inner coupling walls.

12. The acceleration sensor of claim 11, wherein each of the inner coupling walls is provided with two first Z-axis capacitance plates spaced apart at two ends of the corresponding inner coupling wall along the first direction; the two first Z-axis capacitance plates arranged at two ends of the same inner coupling wall are located between the two outer coupling walls formed by an extension of the same second side beam.

13. The acceleration sensor of claim 4, wherein the outer coupling unit is square, and there are four seesaw structures arranged in the outer coupling unit in a matrix; the inner coupling elastic beam is located in a middle of the four seesaw structures and elastically connects the four seesaw structures; every two seesaw structures form a group and are located on one of diagonal lines of the outer coupling unit, and connecting beams of the group of the seesaw structures are parallel to the diagonal line.

14. The acceleration sensor of claim 4, wherein there are four seesaw structures formed a nested structure with each other, and the four seesaw structures are sequentially defined as a first seesaw structure, a second seesaw structure, a third seesaw structure and a fourth seesaw structure along a clockwise direction; the outer coupling unit further comprises four accommodating grooves recessed outward from inner sides of the two first side beams and inner sides of the two second side beams;
   a torsion spring of the first seesaw structure and a torsion spring of the third seesaw structure are both arranged parallel to the first direction and staggered along the second direction;
   two ends of a connecting beam of the first seesaw structure are provided with the first Z-axis capacitance plate, wherein the first Z-axis capacitance plate at one end is located in the accommodating groove formed by a recession of one of the two second side beam, and the first Z-axis capacitance plate at the other end is located in the inner side of the outer coupling unit;
   two ends of a connecting beam of the third seesaw structure are provided with the first Z-axis capacitance plate, wherein the first Z-axis capacitance plate at one end is located in the accommodating groove formed by a recession of the other one of the two second side beam, and the first Z-axis capacitance plate at the other end is located in the inner side of the outer coupling unit;
   a combined structure comprising the first seesaw structure and the first Z-axis capacitance plate arranged at two ends of the first seesaw structure and a combined structure comprising the third seesaw structure and the first Z-axis capacitance plate arranged at two ends of the third seesaw structure are central-symmetric with a geometric center of the outer coupling unit;
   a torsion spring of the second seesaw structure and a torsion spring of the fourth seesaw structure are both arranged parallel to the second direction and staggered along the first direction;
   two ends of a connecting beam of the second seesaw structure are provided with the first Z-axis capacitance plate, wherein the first Z-axis capacitance plate at one end is located in the accommodating groove formed by a recession of one of the two first side beams, and the first Z-axis capacitance plate at the other end is located in the inner side of the outer coupling unit;
   two ends of a connecting beam of the fourth seesaw structure are provided with the first Z-axis capacitance plate, wherein the first Z-axis capacitance plate at one end is located in the accommodating groove formed by a recession of the other one of the two first side beams, and the first Z-axis capacitance plate at the other end is located at the inner side of the outer coupling unit;
   a combined structure comprising the second seesaw structure and the first Z-axis capacitance plate arranged at two ends of the second seesaw structure and a combined structure comprising the fourth seesaw structure and the first Z-axis capacitance plates arranged at two ends of the fourth seesaw structure are central-symmetric with the geometric center of the outer coupling unit; and
   the four first Z-axis capacitance plates located in the inner side of the outer coupling unit are sequentially arranged in a matrix.

15. The acceleration sensor of claim 4, wherein there are four seesaw structures, which are sequentially defined as a first seesaw structure, a second seesaw structure, a third seesaw structure and a fourth seesaw structure along a clockwise direction; the outer coupling unit further comprises four accommodating grooves recessed outward from inner sides of the two first side beams and inner sides of the two second side beams;
   a torsion spring of the first seesaw structure and a torsion spring of the third seesaw structure are both arranged parallel to the first direction and staggered along the second direction;
   one end of a connecting beam of the first seesaw structure extends into the accommodating groove formed by a recession of one of the two second side beams, and the other end extends to the inner side of the outer coupling unit;
   one end of a connecting beam of the third seesaw structure extends into the accommodating groove formed by a recession of the other one of the two second side beams, and the other end of the connecting beam of the third seesaw structure extends into the inner side of the outer coupling unit;
   the first seesaw structure and the third seesaw structure are center-symmetrical with a geometric center of the outer coupling unit;
   a torsion spring of the second seesaw structure and a torsion spring of the fourth seesaw structure are both arranged parallel to the second direction and staggered along the first direction;
   one end of a connecting beam of the second seesaw structure extends into the accommodating groove formed by a recession of one of the two first side beams, and the other end of the connecting beam of the second seesaw structure extends into the inner side of the outer coupling unit;
   one end of a connecting beam of the fourth seesaw structure extends into the accommodating groove formed by a recession of the other one of the two first side beams, and the other end of the connecting beam of the fourth seesaw structure extends into the inner side of the outer coupling unit;
   the second seesaw structure and the fourth seesaw structure are center-symmetrical with the geometric center of the outer coupling unit; and
   the first Z-axis capacitance plates of the plurality of out-of-plane displacement detection devices are arranged on the outer coupling unit and the inner side of the outer coupling unit; the first Z-axis capacitance plates of the plurality of out-of-plane displacement detection devices located at the inner side of the outer coupling unit are located at ends of the four seesaw structures that are close to each other, and are respectively connected to the four seesaw structures through the inner coupling elastic beams.

* * * * *